US006379143B1

(12) United States Patent
Kotaki

(10) Patent No.: US 6,379,143 B1
(45) Date of Patent: *Apr. 30, 2002

(54) INJECTION MOLD

(75) Inventor: Daizo Kotaki, Ashikaga (JP)

(73) Assignee: Daisan Kanagata Seisakusyo Ltd., Ashikaga (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/055,852

(22) Filed: Apr. 6, 1998

(30) Foreign Application Priority Data

Apr. 7, 1997 (JP) ............................................. 9-124638

(51) Int. Cl.[7] .......................... B29C 45/03; B29C 45/18; B29C 45/30
(52) U.S. Cl. ...................... 425/542; 425/568; 425/570; 425/572; 264/328.8; 264/328.12; 249/60
(58) Field of Search ...................... 249/60; 264/328.12, 264/328.8; 425/568, 572, 570, 542

(56) References Cited

U.S. PATENT DOCUMENTS

| 624,513 | A | * | 5/1899 | Lloyd | ........................ 164/333 |
| 770,139 | A | * | 9/1904 | Wood et al. | ........... 164/DIG. 1 |
| 2,349,977 | A | * | 5/1944 | Mazzoni | ....................... 249/60 |
| 2,457,440 | A | * | 12/1948 | Booth | ....................... 264/138 |
| 4,218,038 | A | * | 8/1980 | Garneau, Sr. | ............... 249/160 |
| 4,908,178 | A | * | 3/1990 | Nakagawa et al. | ..... 264/272.17 |
| 5,423,893 | A | | 6/1995 | Kotaki | |
| 5,650,181 | A | | 7/1997 | Kotaki | |
| 6,139,309 | A | * | 10/2000 | Kotaki | ........................ 425/542 |

FOREIGN PATENT DOCUMENTS

| JP | 7-20677 | 3/1994 |
| JP | 6-126784 | 5/1994 |
| JP | 6-155531 | 6/1994 |
| JP | 7-052164 | 2/1995 |
| JP | 7-137166 | 5/1995 |
| JP | 7-284617 | 10/1995 |

* cited by examiner

Primary Examiner—Jan H. Silbaugh
Assistant Examiner—Stefan Staicovici
(74) Attorney, Agent, or Firm—Dellett and Walters

(57) ABSTRACT

An injection molding apparatus for molding a plastic article by fitting an upper mold and a lower mold by pressing and injecting a molten resin through a pin point gate employs a net groove formed at the upper mold and/or the lower mold, said net groove comprising fine grooves extending in a vertical and/or horizontal directions. A passage groove formed on the net groove of the upper and/or lower molds has a large diameter or width to facilitate the entrance of the molten resin. At least one pin point gate is formed on the passage groove to inject the molten resin into the mold. A frame groove surrounds the net groove in the upper and/or lower molds.

8 Claims, 15 Drawing Sheets

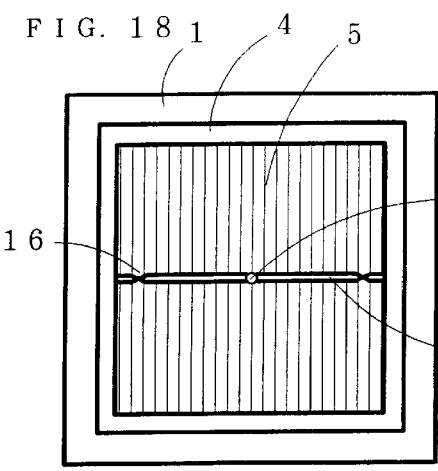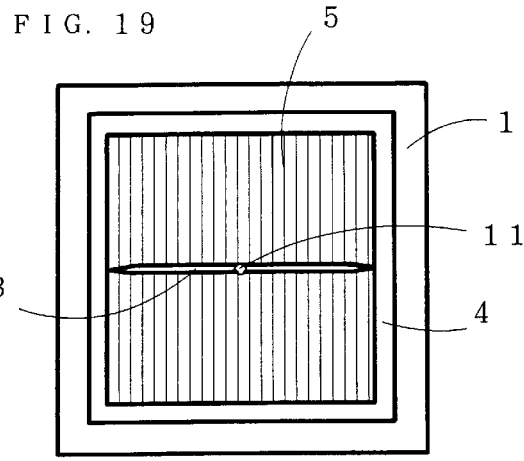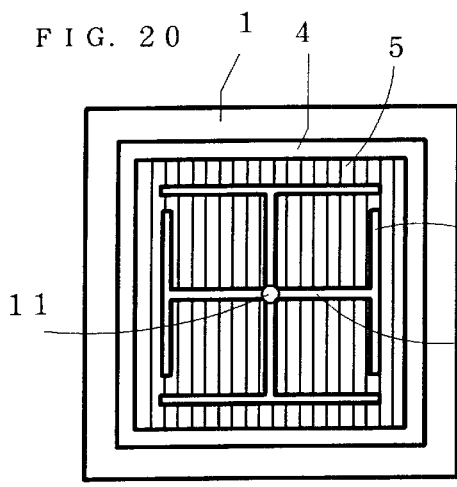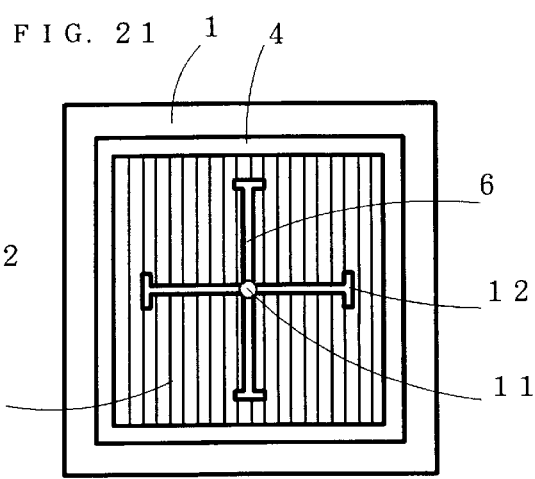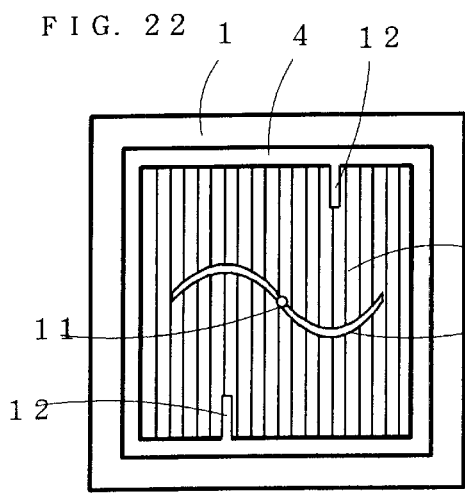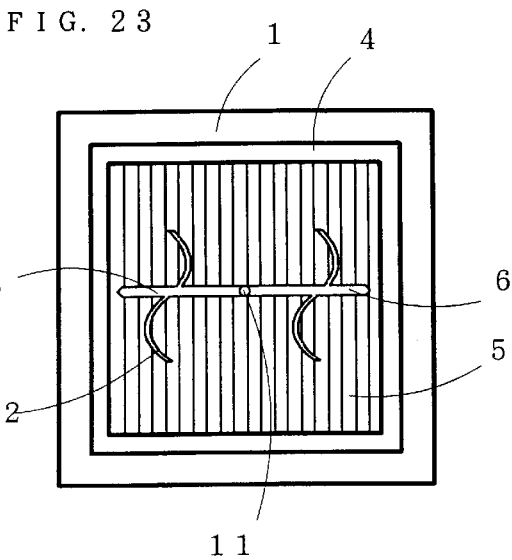

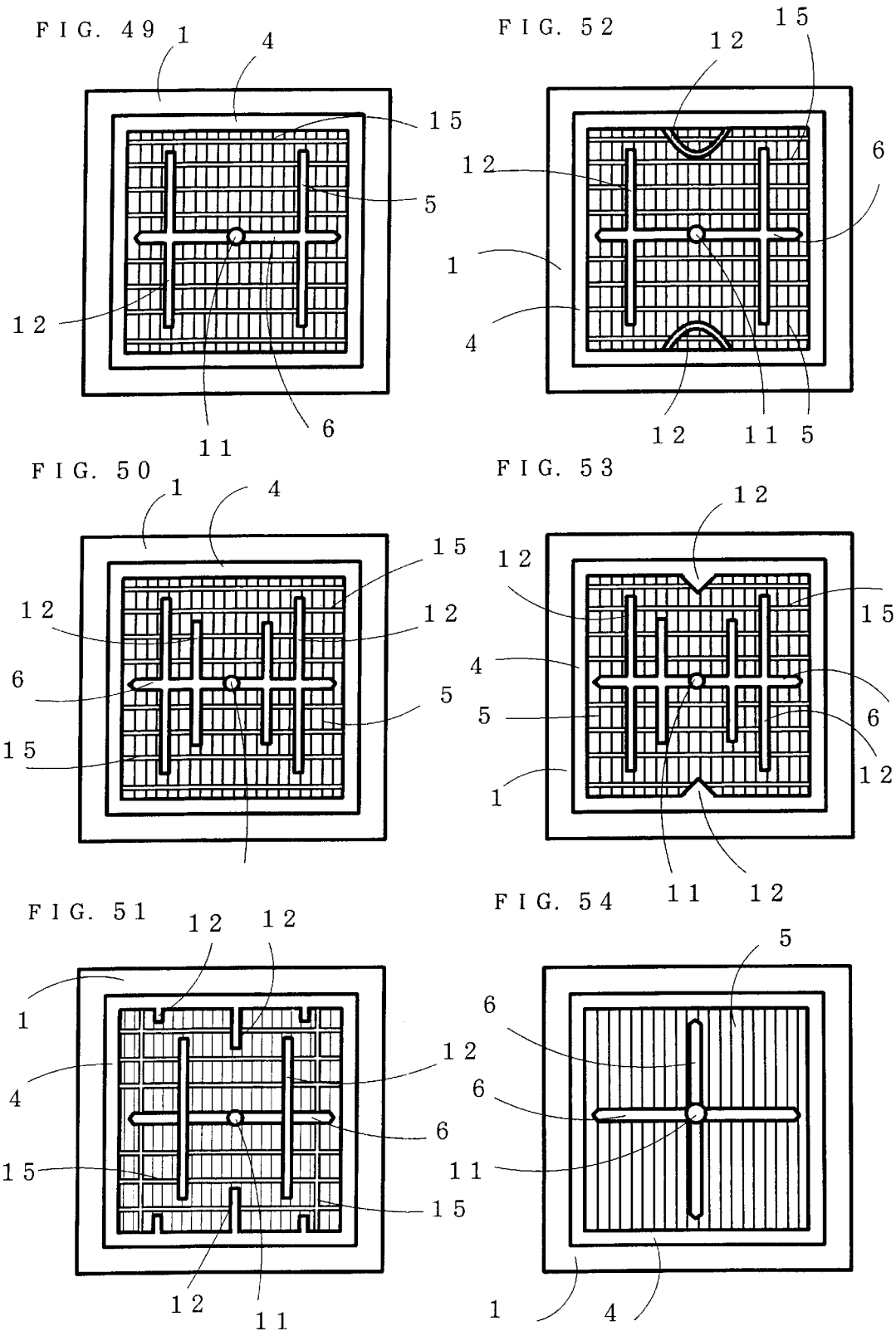

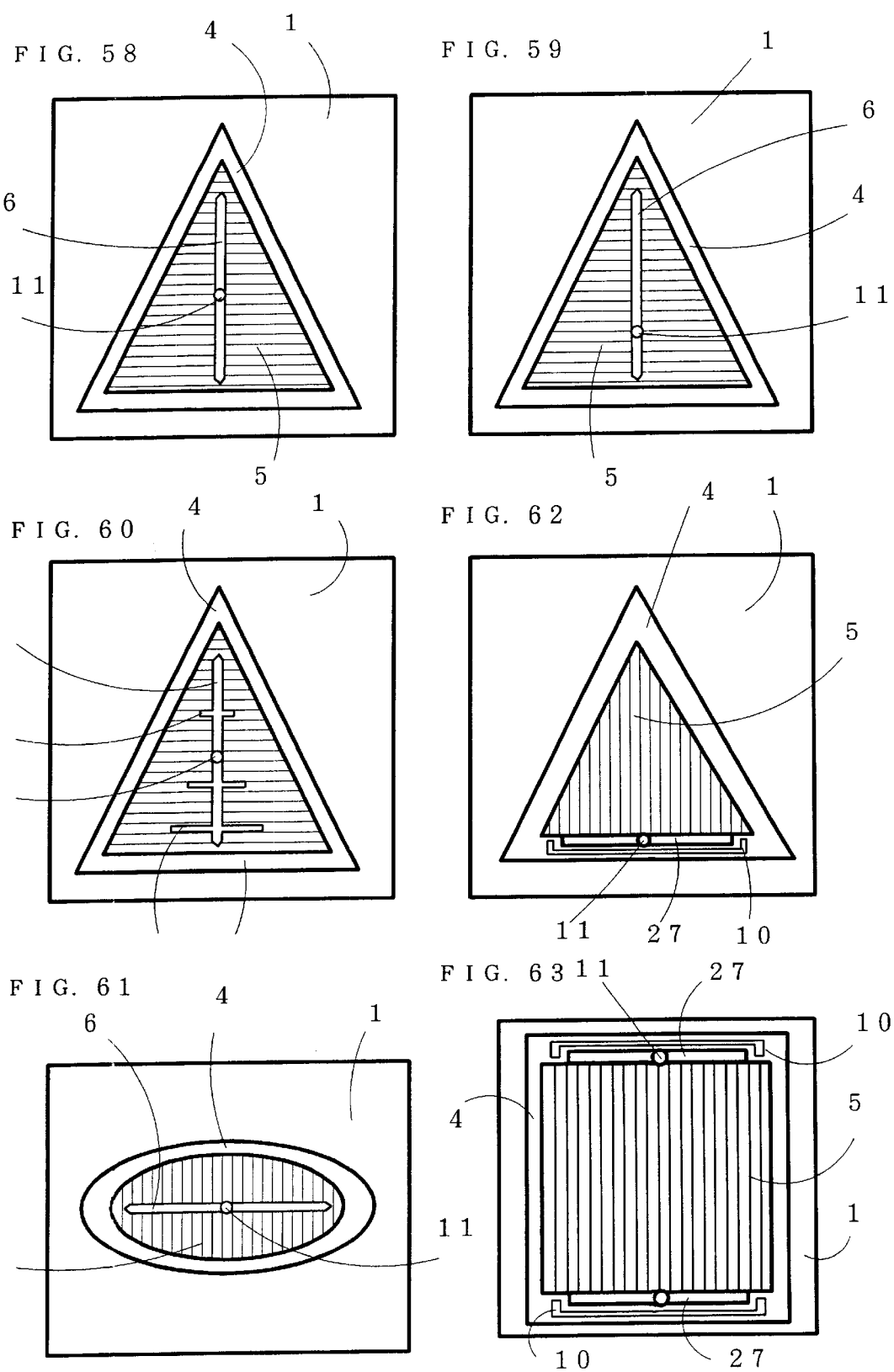

INJECTION MOLD

BACKGROUND OF THE INVENTION

1. Field of the Invention

The present invention relates to molds and molded articles, and more particularly, to molds for forming molded plastic articles which can be used as an oil or air filter used in a car or electronic equipments, a filter used in daily necessities including kitchen utensils and articles used in a bathroom or a toilet, various filters used for straining, draining, and other various purposes, a cover for thin case, a partition, and the like, and the molded articles.

2. Description of the Related Art

Conventionally, molded plastic articles such as a meshed plastic filter or a molded thin plastic plate having a frame were produced by an insert molding instead of an one-piece molding in order to avoid difficulties in molding. But, the insert molding demands too many processes and high cost. In performing the insert molding, bonding of a meshed net to the frame is important. Thus, skilled workers, expensive positioning apparatus and expensive welding apparatus are required for the bonding process.

The attempt at the one-piece molding encountered the following drawbacks:

(1) If molten plastic material is injected into net rib grooves at a low injection pressure, the material can not reach to the end of the grooves and it is likely that there would be some of the net ribs missing or some parts of plate distorted especially at distant locations from a gate.

(2) If a high pressure injection is applied, there would be no ribs missing or plate distorted. But, large-sized equipments are needed for a high injection pressure. In case of net ribs, the space between the ribs would be closed, resulting possibility of fail to serve as a filter or a net. Further, regulation of the pressure is complicated.

(3) It is a fatal drawback that, in the conventional technology, net ribs were produced only by too fine latticed grooves through which molten resin should be compelled to flow. And, since gas or air produced from hot molten resin might stay within the mold, the molten resin could not uniformly reach to the end of the fine grooves even under the sufficiently high injection pressure.

(4) The fine grooves have the latticed shape. Thus, the molten resin stream might come into collision with one another. This fact would also lead to the result that the molten resin could not uniformly reach to the end of the fine grooves even under the sufficiently high injection pressure.

In order to solve the drawbacks (1) to (3), the applicant of this invention has already suggested an improved plastic filter having a guide or an improved mold having a guide groove in the followings:

Japanese Patent Publication No. Pei 7(1995)-20677, Japanese Non-examined Patent Publication Nos. Pei 6(1994)-126784, 6(1994)-155531, 7(1995)52164, 7(1995)-137166 and 7(1995)-284617.

But, further study is necessary to obtain perfectly molded articles having good plasticity and yield without any defect such as burr or weld.

As shown in FIGS. 66 to 69, those suggestions have the problems that flowability of the molten resin is degraded at the points remote from a gate through which the molten resin is injected, and short portions 26 are appeared by the influence of gas or air produced within the mold. Even in case of using the principle of the guide suggested by the applicant of this invention, it is likely that there are short portions 26 at the points beyond the effect of the guide.

The applicant of the present invention noticed that a mold structure which can provide good flowability of the molten resin is more advantageous than the conventional mold having the meshed net formed by the latticed fine grooves. The advantageous mold structure can be obtained by fine grooves each of which extends in one direction and does not have any intersection. The present invention provides a fine meshed filter formed by using the fine grooves each of which are formed by an upper mold and a lower mold which can be fitted together by pressing.

Various products such as plastic baskets and waste baskets used in drain-outlets as a kitchen utensil were produced by the conventional technology. But, all of those was produced by using the grooves formed in one-piece mold. Those could not offer the functions or effects of the present invention. Further, all of those obtained by the conventional technology was formed by using large and wide grooves, and did not applicable to the fine meshed product having the groove interval or the groove width of 1 mm or less.

SUMMARY OF THE INVENTION

There are following problems to be solved in injection molding of an article having a fine-pitch net structure, for example a filter for air conditioner or oil filter, by the one-piece molding;

(1) Mold structure within which little amount of gas or air is produced, (2) Mold structure which can provide generally uniform flow of the molten resin, (3) Mold structure which can improve flowability of the molten resin, and (4) Mold structure which can improve flowability of the molten resin and can prevent missing of rib at the point to which the molten resin can hardly reach, or molding defect in the thick portions.

To solve the above problems, it is an objective of the present invention to provide a mold apparatus which can overcome the disadvantages in the prior art.

Accordingly, to achieve the above objective, the invention provides an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other, (b) at least one passage groove having a large diameter or a large width for facilitating the entrance of the molten resin, one or more of the passage grooves intersecting the fine grooves being formed on the fine grooves of the upper mold and/or the lower mold and formed;

(c) at least one gate formed on the passage groove for injecting the molten resin into the mold; and (d) a frame groove formed to surround the fine grooves in the upper mold and/or the lower mold.

Further, the passage groove is communicated with the frame groove through a sharp-pointed end of the passage groove, in order to prevent the molten resin from being entered through the passage groove into the frame groove without any obstacle.

In addition, the passage groove is communicated with the frame groove through a constricted end of the passage groove and the end of the passage groove connected to the frame groove has a large diameter or a large width, in order to prevent the molten resin from being entered through the passage groove into the frame groove without any obstacle.

Also, the passage groove comprises a plurality of constricted portions to form a plurality of divided parts, and gates are formed on each of the divided parts of the passage groove for injecting the molten resin into the mold, in order to prevent the molten resin from being entered through the passage groove into the frame groove without any obstacle and facilitate the entrance of the molten resin into the fine grooves.

Still further, the passage groove is formed as a guide groove having a large diameter or a large width, both ends of which are not directly connected to the frame groove, in order that the molten resin injected through the gate into the mold can be entered into the fine grooves after the pressure of the molten resin is accumulated.

Additionally a band-shaped groove having a large diameter or a large width is formed at an end of the guide groove in a direction intersecting the guide groove to form a substantially T-shaped end of the guide groove, in order that the molten resin injected through the gate into the mold can be entered into the fine grooves in a wide range after the pressure of the molten resin is accumulated.

Also a band-shaped groove having a large diameter or a large width is formed in a direction intersecting the passage groove, in order that the molten resin injected through the gate into the mold can be entered into the fine grooves in a wide range after the pressure of the molten resin is accumulated.

A band-shaped groove having a large diameter or a large width is formed in a S-shaped configuration in a direction intersecting the passage groove, in order that the molten resin injected through the gate into the mold can be uniformly entered into the fine grooves in a wide range after the pressure of the molten resin is accumulated.

Further, a plurality of band-shaped grooves having a large diameter or a large width is formed in a symmetrical form centering around the gate in a direction intersecting the passage groove, in order that the molten resin injected through the gate into the mold can be uniformly entered into the fine grooves in a wide range after the pressure of the molten resin is accumulated.

In addition, the plurality of band-shaped grooves having a large diameter or a large width is formed in a symmetrical form centering around the gate in a direction intersecting the passage groove and has a gradually elongated configuration from the gate toward outer sides, in order that the molten resin injected through the gate into the mold can be uniformly entered into the fine grooves in a wide range after the pressure of the molten resin is accumulated.

The invention provides an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other (b) at least one cross-shaped passage groove having a large diameter or a large width for facilitating the entrance of the molten resin, the passage groove being formed on the fine grooves of the upper mold and/or the lower mold and formed in a direction intersecting and parallel with the fine grooves;

(c) at least one gate formed on an intersection of the cross-shaped passage grooves for injecting the molten resin into the mold; and (d) a frame groove formed to surround the fine grooves in the upper mold and/or the lower mold.

The invention further provides an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) a frame groove formed in a circular shape including an elliptical shape in the upper mold and/or the lower mold so as to surround the fine grooves;

(c) at least one passage groove having a large diameter or a large width for facilitating the entrance of the molten resin, one or more of the passage grooves intersecting the fine grooves being formed on the fine grooves of the upper mold and/or the lower mold and being curved to have a substantially similar form to the frame groove; and (d) at least one gate formed on the passage groove for injecting the molten resin into the mold.

The invention also provides an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) at least one passage groove having a large diameter or a large width for facilitating the entrance of the molten resin, one or more of the passage grooves intersecting the fine grooves being formed on the fine grooves of the upper mold and/or the lower mold;

(c) at least one gate formed on the passage groove for injecting the molten resin into the mold;

(d) a frame groove surrounding the fine grooves in the upper mold and/or the lower mold; and (e) engaging grooves formed within the frame groove or outer periphery of the frame groove of the upper mold and/or the lower mold to be engaged with each other.

Further an injection molding apparatus is provided for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) at least one passage groove having a large diameter or a large width for facilitating the entrance of the molten resin, one or more of the passage grooves intersecting the fine grooves being formed on the fine grooves of the upper mold and/or the lower mold;

(c) at least one gate formed on the passage groove for injecting the molten resin into the mold;

(d) a frame groove surrounding the fine grooves in the upper mold and/or the lower mold;

(e) the upper mold including two or more of mold pieces formed on the same plane surface, each of the pieces being composed of said (a) to (d), and the fine grooves of each pieces being extended to a different direction by 90° with respect to another piece;

(f) the lower mold perfectly symmetrical with the upper mold; and (g) a hinge groove formed between the two or more of mold pieces formed on the same plane to form a freely folding hinge portion.

Also provide is provides an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) a frame groove surrounding the fine grooves in the upper mold and/or the lower mold;

(c) at least one pressure accumulation groove formed on the frame groove of the upper mold and/or the lower mold and having gate for injecting the molten resin into the mold: and (d) at least one bypass groove formed on the frame groove of the upper mold and/or the lower mold to surround the pressure accumulation groove for effecting bypass flow of the molten resin from the pressure accumulation groove.

Another provision of the invention is an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) at least one passage groove having a large diameter or a large width for facilitating the entrance of the molten resin, one or more of the passage grooves intersecting the fine grooves being formed on the fine grooves of the upper mold and/or the lower mold;

(c) at least one gate formed on the passage groove for injecting the molten resin into the mold;

(d) a frame groove surrounding the fine grooves in the upper mold and/or the lower mold; and (e) a bypass wall formed within the frame groove facing an end of the passage groove in the longitudinal direction for effecting bypass flow of the molten resin entered from the passage groove.

Still further the invention provides an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) a frame groove surrounding the fine grooves in the upper mold and/or the lower mold;

(c) at least one guide groove having a large diameter or a large width formed on the fine grooves on the upper mold and/or the lower mold in a direction intersecting the fine grooves, both ends of the guide groove being not directly connected to the frame groove, in order that the molten resin injected through the gate into the mold can be entered into the fine grooves after the pressure of the molten resin is accumulated;

(d) at least one gate formed on the guide groove for injecting the molten resin into the mold; and (e) a bypass wall formed within the frame groove facing an end of the guide groove in the longitudinal direction for effecting bypass flow of the molten resin entered from the guide groove.

Also provided is an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) at least one passage groove having a large diameter or a large width for facilitating the entrance of the molten resin, one or more of the passage grooves intersecting the fine grooves being formed on the fine grooves of the upper mold and/or the lower mold;

(c) at least one gate formed on the passage groove for injecting the molten resin into the mold;

(d) a frame groove surrounding the fine grooves in the upper mold and/or the lower mold; and (e) a fitting wall formed within the frame groove facing an end of the passage groove in the longitudinal direction for effecting bypass flow of the molten resin entered from the passage groove into the frame groove for fitting the upper mold and the lower mold by press.

Another provision of the invention is an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other, (b) a frame groove surrounding the fine grooves in the upper mold and/or the lower mold;

(c) at least one guide groove having a large diameter or a large width formed on the fine grooves on the upper mold and/or the lower mold in a direction intersecting the fine grooves, both ends of the guide groove being not directly connected to the frame groove, in order that the molten resin injected through the gate into the mold can be entered into the fine grooves after the pressure of the molten resin is accumulated;

(d) at least one gate formed on the guide groove for injecting the molten resin into the mold; and (e) a fitting wall formed within the frame groove facing the end of the guide groove in the longitudinal direction for effecting bypass flow of the molten resin entered from the guide groove into the frame groove for fitting the upper mold and the lower mold by press.

In addition the bypass wall formed within the frame groove facing the end of the guide groove in the longitudinal direction, or the fitting wall formed within the frame groove facing the end of the guide groove in the longitudinal direction for fitting the upper mold and the lower mold by press has a "⊂" shaped form.

Further, a band-shaped groove is extended from the frame groove toward the gate and extended to communicate with the frame groove, in order to form a perfect net by entering the molten resin into the fine grooves after the molten resin is entered into the frame groove.

Still further, very thin or very shallow piano wire grooves are formed to intersect a plurality of the fine grooves for preventing fine lines of the fine grooves from being bent or deformed.

Also, the fine grooves of the upper mold have the same width and the same depth as the fine grooves of the lower mold.

In addition, the fine grooves of the upper mold have a larger or smaller depth than the fine grooves of the lower mold.

Still further, the fine grooves of the upper mold have a larger or smaller width than the fine grooves of the lower grooves.

Also provided is an injection molding apparatus for molding a plastic articles having a frame by fitting an upper mold and a lower mold by press, and injecting molten resin through a gate, wherein the improvement comprises:

(a) a net groove formed in stripes by a plurality of fine grooves extended only in one direction in each of the upper mold and the lower mold, the fine grooves in the upper mold and the lower mold being faced with each other;

(b) at least one passage groove having a large diameter or a large width for facilitating the entrance of the molten resin, one or more of the passage grooves intersecting the fine grooves being formed on the fine grooves of the upper mold and/or the lower mold;

(c) at least one gate formed on the passage groove for injecting the molten resin into the mold;

(d) a frame groove surrounding the fine grooves in the upper mold and/or the lower mold; and (e) the fine grooves arranged to shift a pitch of the fine grooves between upper and lower sides or between left and right sides of a plurality of pieces, said (a) to (d) being continuously formed in each of the pieces.

According to the invention there is also provided a molded plastic article including a filter formed by the injection molding apparatus having any of the above-mentioned features.

BRIEF DESCRIPTION OF THE DRAWINGS

The above objective and advantages of the present invention will become more apparent by describing in detail preferred embodiments thereof with reference to the attached drawings in which:

FIGS. 18 to 40 are top views of the injection molds according to other embodiments of the present invention, respectively;

FIGS. 49 to 54 are top views of the injection molds according to other embodiments of the present invention, respectively;

FIGS. 58 to 65 are top views of the upper molds of the injection mold according to other embodiments of the present invention, respectively;

DESCRIPTION OF THE PREFERRED EMBODIMENTS

Figure 1A:
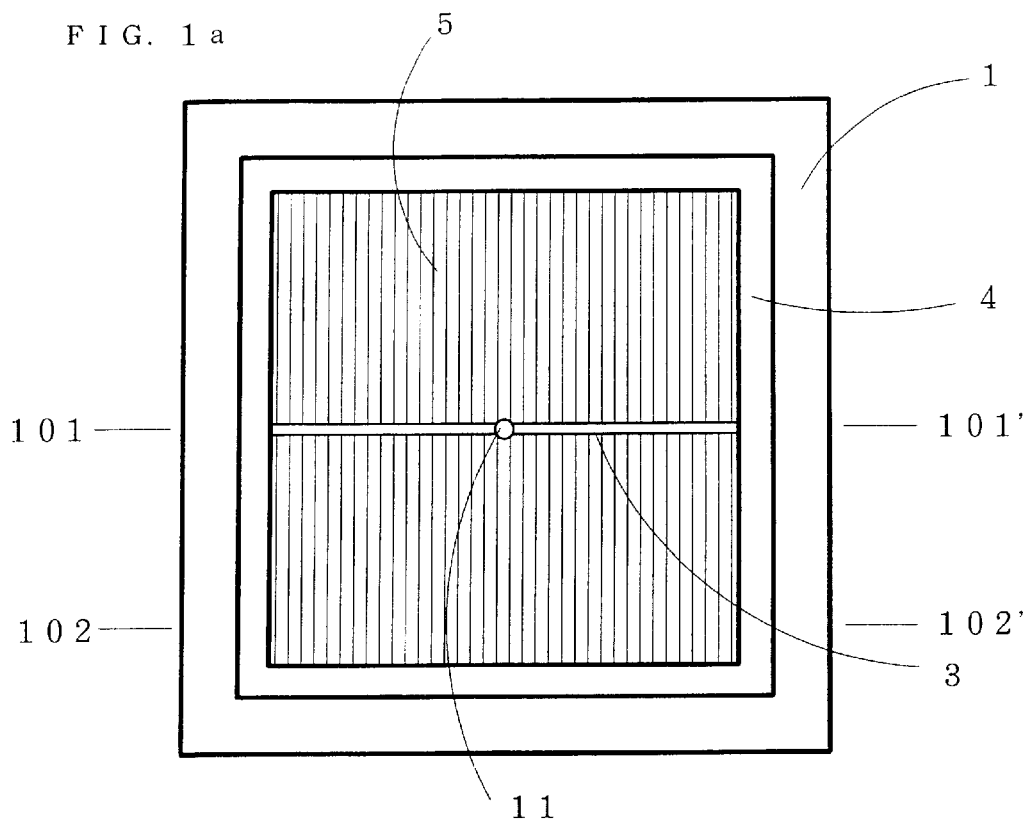
FIGS. 1a, 1b and 1c are a top view and sectional views of the injection mold according to the present invention, respectively.
Figure 1B:
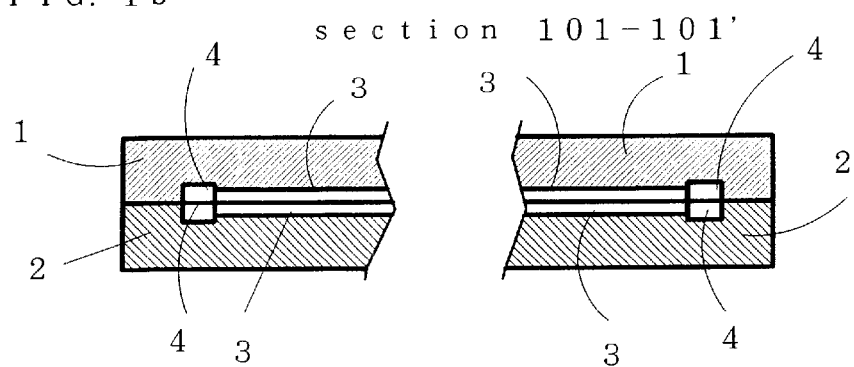
Figure 1C:
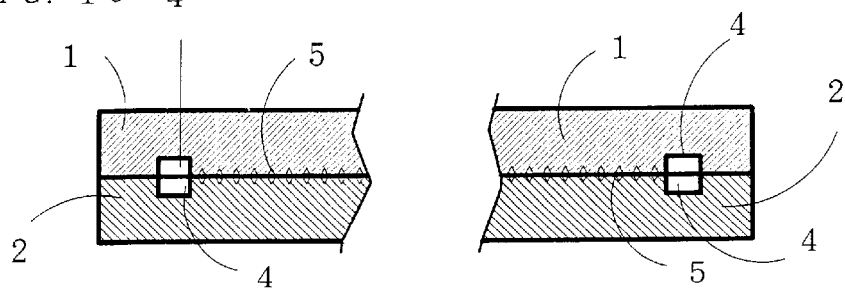

FIGS. 1a to 1c represent a plastic filter as a molded article having a meshed net structure, to which the present invention can be suitably applied.

FIG. 1a is a top view representing a mold for plastic filter according to the present invention. An upper mold 1 includes fine grooves 5 extended only in a vertical direction in the upper mold 1 and a frame groove 4 surrounding the fine grooves 5. A passage groove 3 having a large diameter for promoting the flow of molten resin is extended in a direction intersecting the fine grooves 5 in the middle of the fine grooves 5. A gate 11 is formed at the center of the flow path groove 3, through which the molten resin is injected into the mold. A lower mold (not shown) also includes the fine grooves 5 extended only in a vertical direction in the lower mold and the frame groove 4 surrounding the fine grooves 5 as in the upper mold 1, excepting the passage groove 3. According to the article to be molded, the lower mold may include the passage groove 3, The molten resin entered through the gate 11 to the passage groove 3 flows toward the frame groove 4, and at the same time flows into the fine grooves 5 formed at both sides of the passage groove 3 then turns into a striped net filter having a frame.

The fine grooves 5 are extended only in one direction. Thus, there is no possible of collision of the molten resin streams between the narrow grooves, and flowability of the molten resin can be improved. At the same time, diamond-shaped net grooves 7 are formed by the fine grooves 5 each formed in the upper mold 1 and the lower mold 2. Thus, the net grooves 7 has a large volume, and the center of each net grooves 7 is so enlarged that a circular inner skin can be adequately formed during and after the flow of the molten resin. According to the conventional latticed grooves, vertical grooves are formed in an upper mold and horizontal grooves are formed in a lower mold. In this configuration, the molten resin flows through minute trapezoid grooves having a half volume of that of the present invention. Thus, the skin layer can not be easily formed and the load on the molding apparatus is too large. And, if the temperature of the molten resin is raised or the injection pressure is raised in order to lessen the load on the molding apparatus, gases are produced within the mold or the net is defected.

FIG. 1*b* is a sectional view along the line 101–101' of FIG. 1*a* illustrating a combination of the upper mold 1 and the lower mold 2, each of which are fitted together by pressing. In the combination, the passage grooves 3 are opposed to each other. But, only one passage groove may be formed in the upper mold 1 or the lower mold 2 according to the kind of the article to be molded.

FIG. 1*c* is a sectional view along the line 102–102' of FIG. 1*a*. The fine grooves 5 formed in the upper mold 1 in one direction and the fine grooves 5 formed in the lower mold 2 in one direction are fitted together to be opposed to each other.

Since the fine grooves 5 in the upper mold 1 and the lower mold 2 are symmetrically formed and are fitted together by pressing, there is no possible of collision of the molten resin streams between the fine grooves, and the molten resin can smoothly flow. Thus, mass production of the molded articles having a large area or the molded articles composed of a fine net becomes possible by a low injection pressure.

Through the test according to the present invention, it was found that the injection pressure of about 80 kg was sufficient for producing a latticed net filter having 200 angles or 110 angles. According to the conventional technology, the injection pressure of about 100 kg or more was required for the same result. And, it was found that the molds could be fitted with a smaller fitting power of 100 ton or less in comparison with the conventional case in which relative large fitting power of about 200 ton was required. And, the molds can be fitted by pressing in one direction. Thus, the frames can be easily separated differently from the case of the latticed grooves, and short number can be raised. Accordingly, an article having a fine net can be molded in a short time.

Figure 2A:
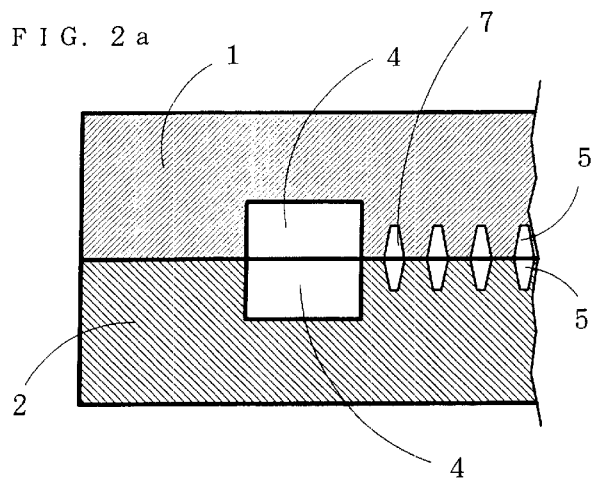
FIGS. 2a and 2b are partially sectional views of the injection mold according to the present invention.

It will be observed, by considering FIG 1*a*, 1*c* and 2*a*, for example, that the fine grooves in the two plates extend only in one substantially same, parallel direction. When the plates are faced together, the grooves align or face each other, and extend in the same one direction. This is observable in FIGS. 2*a*, 3*a*, 4*a*, for example.

FIGS. 2*a* and 2*b* to FIGS. 4*a* and 4*b* are sectional views of the enlarged mold and sectional views of the enlarged molded articles, respectively.

FIG. 2*a* shows a partially sectional view in which the fine grooves 5 in the upper mold 1 and the lower mold 2 have the same groove width and the same groove depth, respectively. The fine grooves 5 are tapered from their opening portions to their bottom portions by about 10 degrees to result a trapezoid space. A net grooves 7 are formed by each of the fine grooves. 5 in the upper mold 1 and the lower mold 2.

Figure 2B:
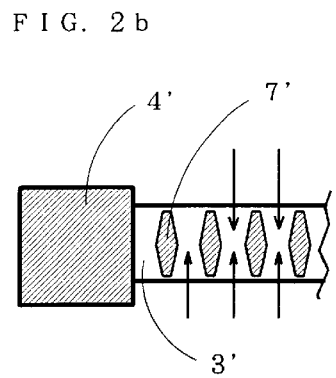

FIG. 2*b* is a partially sectional view of an article molded by the molds of FIG. 2*a*. The molded article is composed of a frame 4', a passage 3' and a diamond-shaped net ribs 7'. Since the upper mold 1 and the lower mold 2 are formed to have the same groove width and the same groove depth, a double-sided filter, both sides of which are useful, can be realized by a simple mold structure.

Figure 3A:
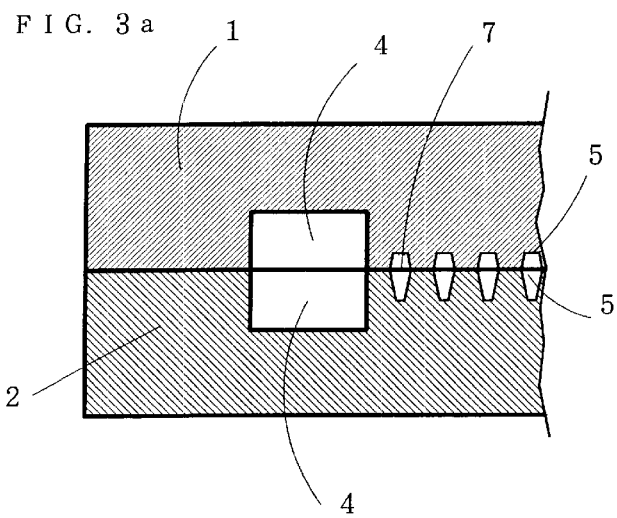
FIGS. 3a and 3b are partially sectional views of the injection mold according to the present invention.

FIG. 3*a* is a partially sectional view of a molded article in which the depth of the fine grooves 5 in the upper mold 1 is smaller than that of the fine grooves 5 in the lower mold 2. Since the depth of the fine grooves 5 in the upper mold 1 is smaller than that of the fine grooves 5 in the lower mold 2, a net grooves 7 formed by each of the fine grooves 5 in the upper mold 1 and the lower mold 2 have the flattened diamond shape.

Figure 3B:
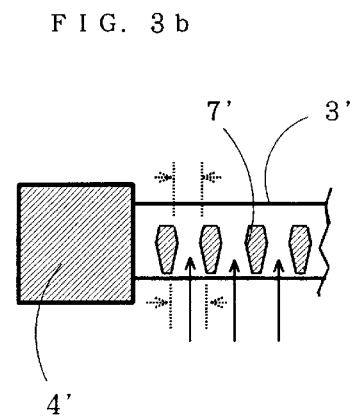

FIG. 3*b* is a partially sectional view of an article molded by the mold of FIG. 3*a*. The molded article is composed of a frame 4', a passage 3' and a flattened diamond-shaped net ribs 7'. Each of the net ribs 7' which forms a net of the filter has one sharp-pointed end and the other flattened end. As shown by a dotted line, the aperture rate at each sides is different from each other. Thus, by a simple mold structure, it is possible to realize a one-sided filter which has one side through which fluids such as air can easily be entered and the other side through which fluids such as air can hardly be entered.

Figure 4A:
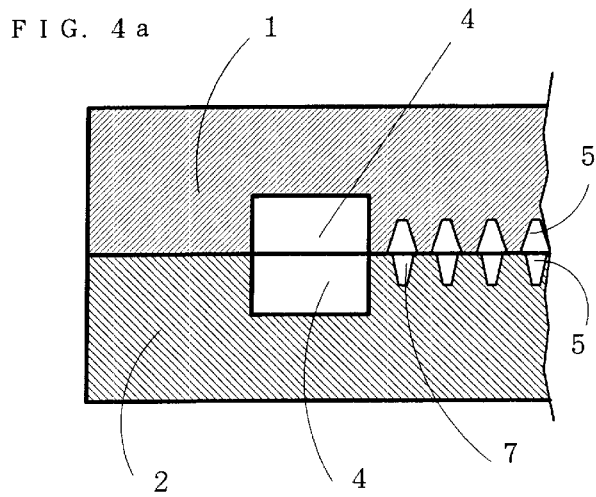
FIGS. 4a and 4b are partially sectional views of the injection mold according to the present invention.

FIG. 4*a* is a partially sectional view of a molded article in which the width of the fine grooves 5 in the upper mold 1 is greater than that of the fine grooves 5 in the lower mold 2. A wedge-shaped net grooves 7 are formed by the fine grooves 5 in the upper mold 1 and the fine grooves 5 in the lower mold 2.

Figure 4B:
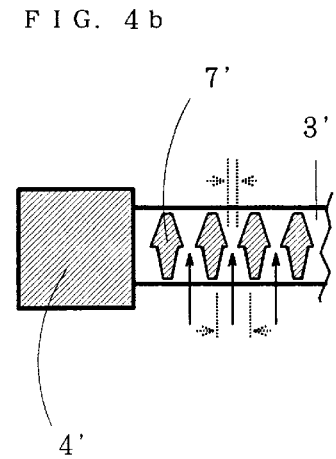

FIG. 4*b* is a partially sectional view of a molded article by the mold of FIG. 4*a*. The molded article is composed of a frame 4', a passage 3' and a wedge-shaped net ribs 7'. Each of the net ribs 7' which forms a net of the filter has a middle portion widened in a shape of flange. Thus, as shown by a dotted line, the aperture rate at each sides is substantially different from each other. Thus, by a simple mold structure, it is possible to realize a one-sided filter which has one side through which fluids such as air can easily be entered and the other side through which fluids such as air can hardly be entered.

Figure 5:
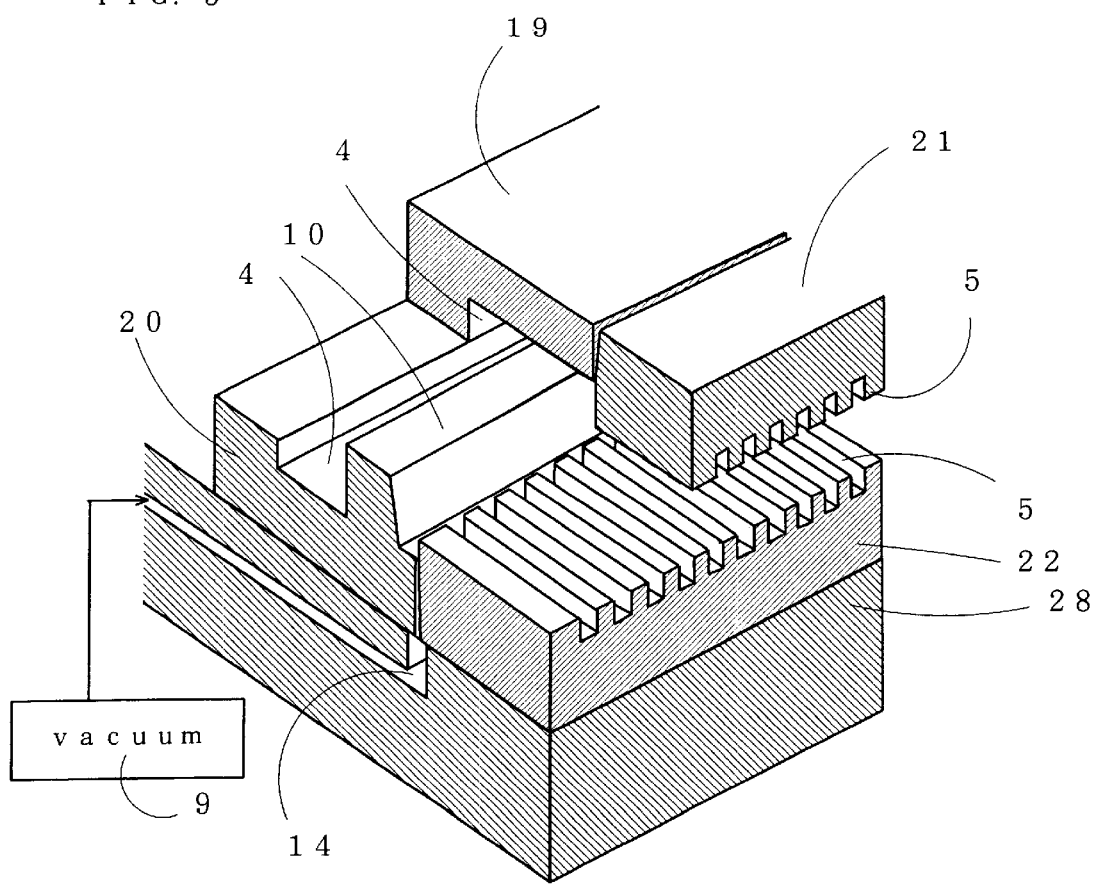
FIG. 5 is a partially sectional view of the injection mold according to the present invention.
Figure 6:
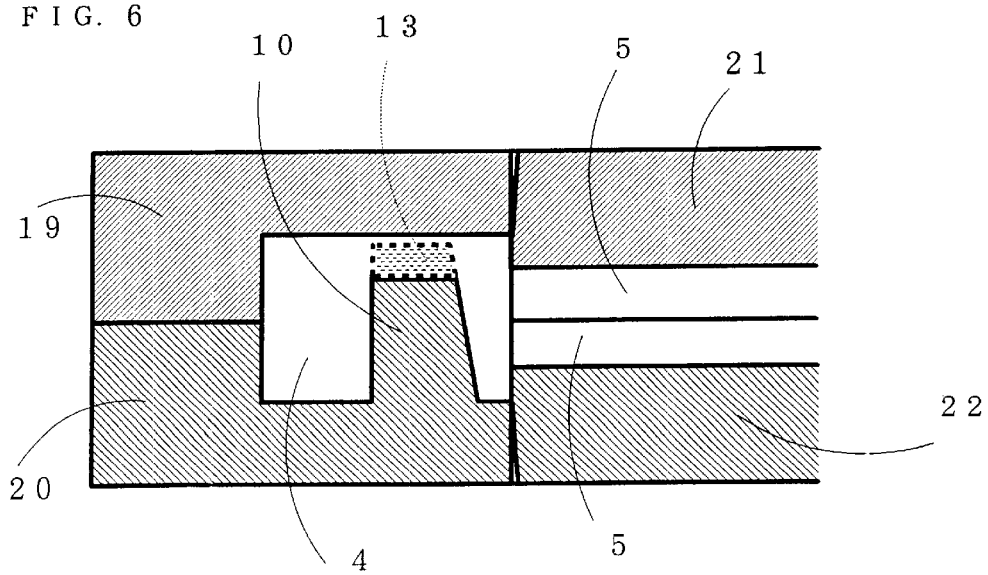
FIG. 6 is a partially sectional view of the injection mold according to the present invention.

FIGS. 5 and 6 show the structure in which a wall is provided such that the entrance of the molten resin through the frame groove is halted by the wall, whereby effecting the preferential entrance to the fine grooves and prevent missing of the net.

FIG. 5 is a perspective view of a mold in which the frame groove 4 and the fine grooves 5 are formed by separate inserts. The mold comprises a base mold 28 into which a venting passage 14 is extended to vacuum 9 for ventilating gas or air, an upper frame 19 in which the frame groove 4 is formed, a lower frame 20 in which a bypass wall 10 and the frame groove 4 are formed, an upper mold 21 in which the fine grooves 5 are extended in one direction, and a lower mold 22 in which fine grooves 5 are extended in one direction. The stream of the molten resin entering into the frame groove 4 from the fine grooves 5 is suppressed by the bypass wall 10 and a net rib is preferentially formed to ensure the formation of the net filter.

And, thee bypass wall 10 is tapered so that the molten resin or gas can be effectively entered into the frame groove 4. In case of no sufficient molten resin entering into a back side of the frame groove 4, another stream of the molten resin flowing from the another frame groove 4 is entered into the back side of the frame groove 4 through both sides of the back side of the bypass wall 10, which causes weld. The welded portion is liable to be damaged.

FIG. 6 is a sectional view when the molds shown in FIG. 5 are fitted by press. In FIG. 6, the bypass wall 10 faces the fine grooves 5. According to another embodiment of the present invention, a mold fitting wall 13 may be used instead of the bypass wall 10 as shown by a dotted line. The mold fitting wall 13 can keep about 0.01 to 0.05 mm away from a top surface of the frame groove 4. Or, it is possible that there is no space between the mold fitting wall 13 and the top surface of the frame groove 4 so that the mold fitting wall 13 is tightly contact to the top surface of the frame groove 4. Thus the molten resin can not be entered to the back side of the frame and only the gas or air which is generated inside of the mold can be driven into the back side of the frame groove. And, the molten resin dashed against the wall flows through a bypass passage formed along the wall with reduced gas or air. Thus, the net is preferentially formed in comparison with the frame.

The width of the bypass passage is exaggerated for convenience' sake. Actually, the bypass passage may have the width of about 0.13 to 0.5 mm. If the bypass passage has too large width, the suppression of the flow of the molten resin by the bypass wall 10 or the mold fitting wall 13 is little effected, so that the flowability of the molten resin to the horizontal direction is weakened.

The fundamental spirit of a hill for suppressing the flow of the molten resin and small passage for fluid has already known. But, in this embodiment, the fine grooves 5 formed in one direction provide a good flowability of fluids and the molten resin is preferentially flow to the frame groove 4 in any case. Thus, the present invention provides good effect and usefulness beyond comparison with the conventional hill or small passage for fluid.

Figure 7:
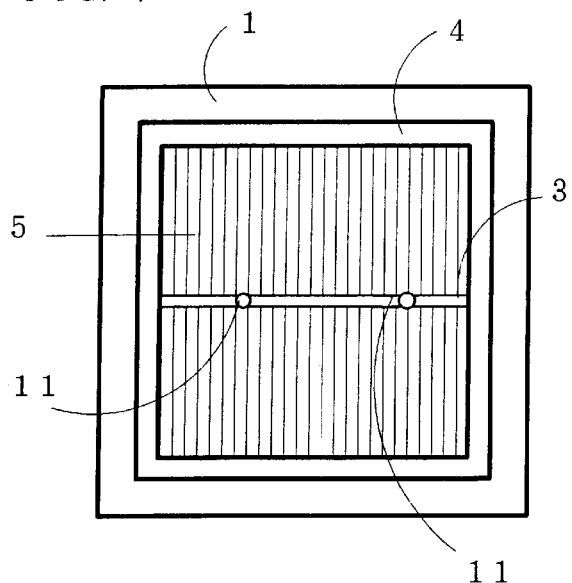
FIG. 7 is a top view of the upper mold of the injection mold according to another embodiment of the present invention.
Figure 10:
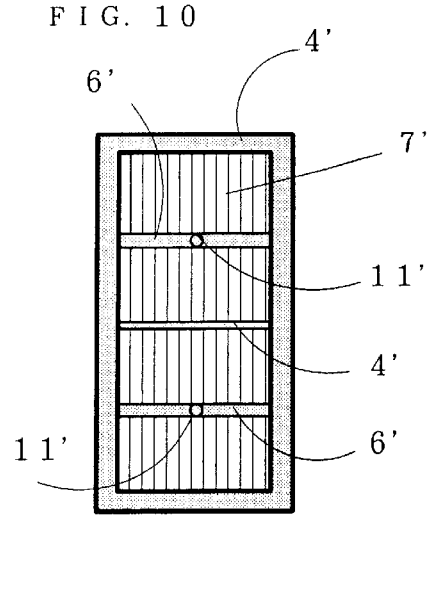
FIGS. 10 to 17 are top views of the molded articles formed by the injection mold according to the present invention, respectively.
Figure 8:
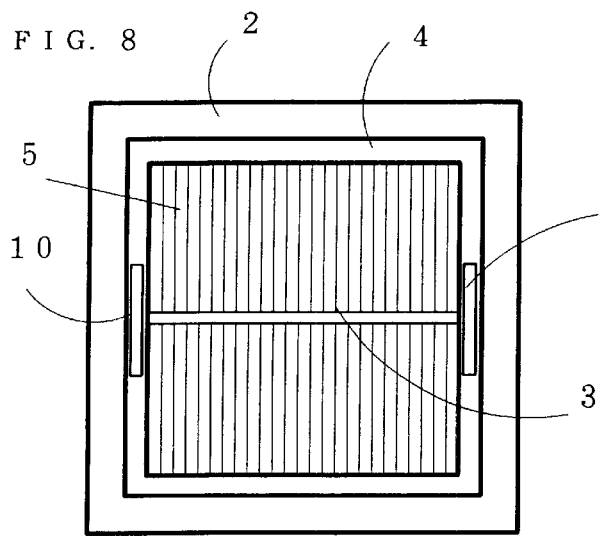
FIG. 8 is a top view of the lower mold of the injection mold according to another embodiment of the present invention.
Figure 11:
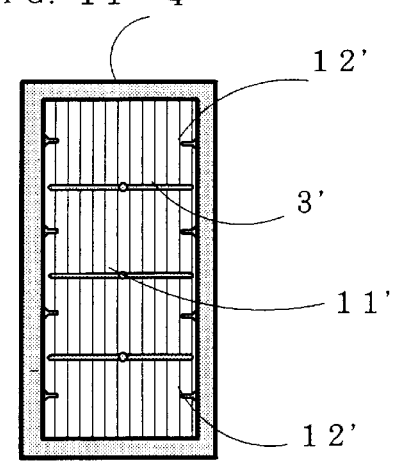
Figure 9:
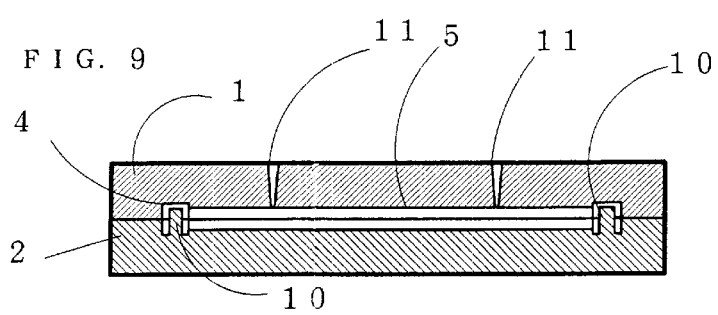
FIG. 9 is a sectional view of the injection mold formed by bring the upper mold of FIG. 7 and the lower mold of FIG. 8 to fit together.

FIGS. 7 to 9 are top views of the upper mold 1 and the lower mold 2, and sectional view when the upper mold 1 and the lower mold 2 are fitted by press, respectively.

It is characterized that a plurality of gates 11 is formed on the passage groove 3. Thus, the entrance of the molten resin into the mold can be rapidly effected, and at the same time, the flowability of the molten resin can be improved. And, the bypass wall 10 faces the passage groove 3 and entering of the molten resin from the passage groove 3 into the frame groove 4 is suppressed by the bypass wall 10, in the same manner to the above-mentioned bypass wall 10 or the mold fitting wall 13 which faces the fine grooves 5, whereby effecting the preferentially formation of the net rib. Thus, a net filter can be securely formed.

Figure 25:
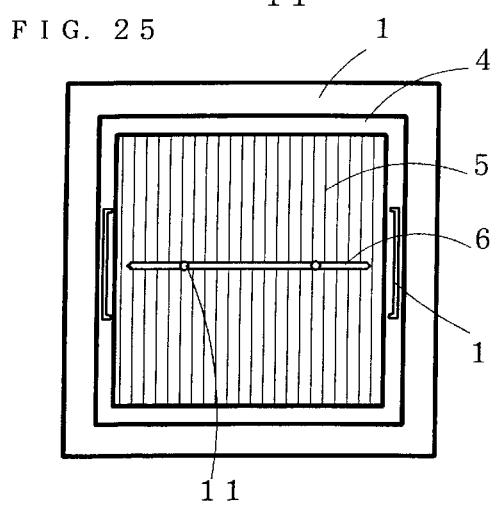
Figure 28:
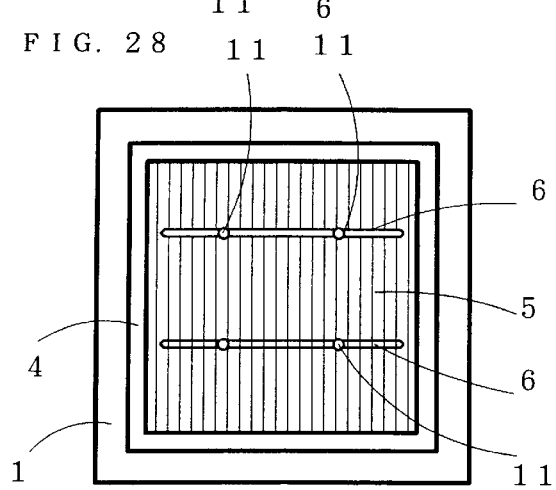
Figure 26:
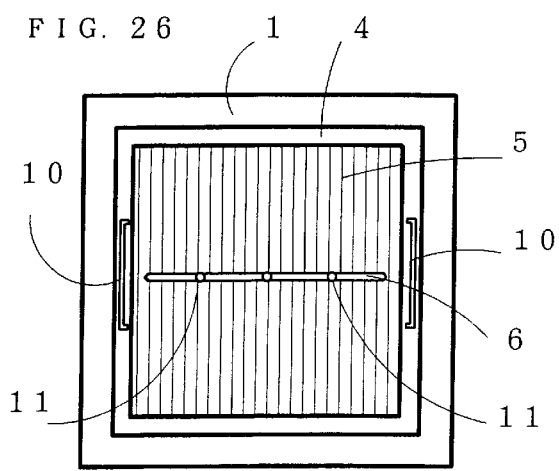
Figure 29:
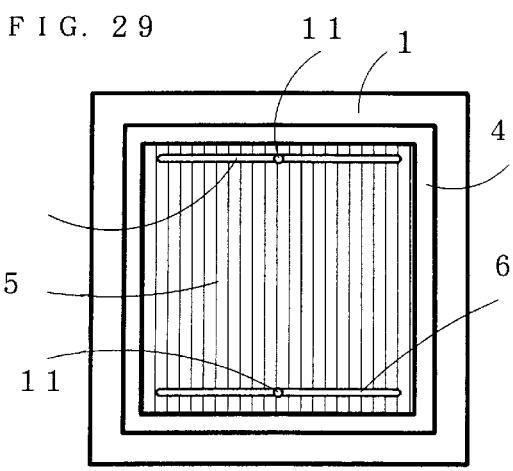

FIGS. 24 to 27 show variations of the bypass wall 10. In these cases, the bypass wall 10 has substantially "⊂" shaped form. In such a configuration, the molten resin can not be entered into the frame groove 4. In order to overcome the disturbance of the flow of the molten resin, a plurality of gates 11 can be formed as shown in FIGS. 25 and 26.

FIGS. 12 to 17 show various examples of large molded articles which can be made by using the mold according to the present invention. Another features of those are the facts that the articles are molded by using the mold which has a guide groove and the passage groove is not directly connected to the frame groove.

The molds using the guide groove have been described in Japanese Patent Publication No. Pei 7(1995)-20677, Japanese Non-examined Patent Publication No. Pei 6(1994)-126784 and Japanese Non-examined Patent Publication No. Pei 6(1994)-155531. Followings are the principles of the above disclosures. The molten resin entered through the gate flows to a guide groove having a large diameter into a dead-end to which the frame groove is not connected. Predetermined amount of the pressure of the flow of the molten resin is stored at the dead-end and the molten resin is pressed into fine grooves communicating with the guide groove. The molten resin can be entered into the end of the fine grooves and can be molded into a minute net filter by the low-pressure molding method. FIGS. 12 to 17 illustrate the articles having guides 6' formed by using the guide groove. In case of the striped net filter as in the present invention, it is preferable that the length of the guides 6' is equal to that of frames 4'. The reason is as follows. In case of the conventional latticed net, the molten resin can flow to the whole region of the filter through the connection within the net even though the guide is separated from the frame. But, in case of the striped net filter according to the present invention, there is no direct connection within the net. Accordingly, net can not be formed if the guide is too far from the frame. According to the tests, it was effective when the gap between the guide and the frame corresponds to approximately one fine groove.

Figure 12:
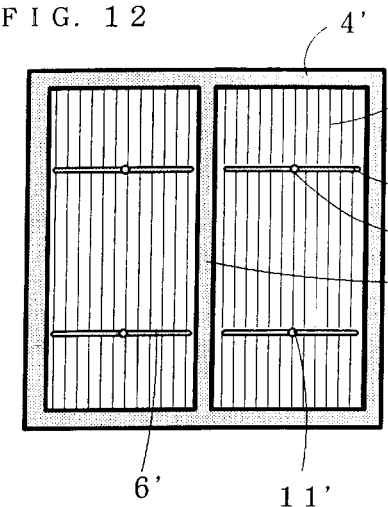
Figure 15:
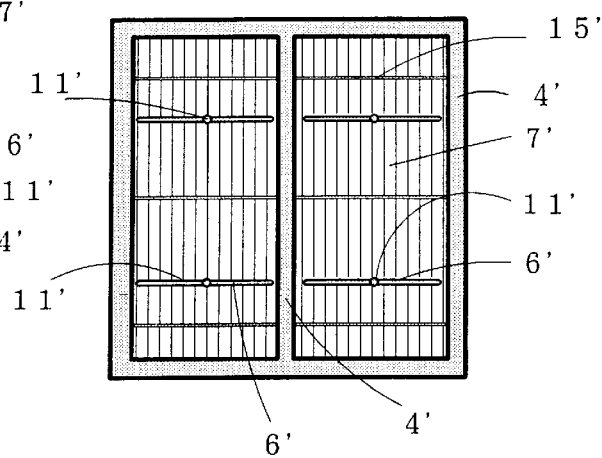
Figure 13:
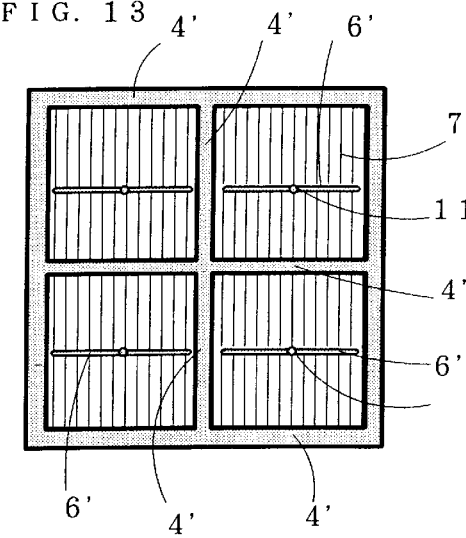
Figure 16:
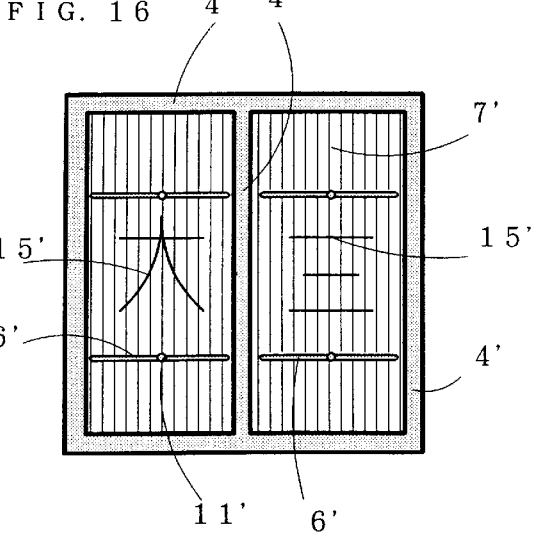
Figure 14:
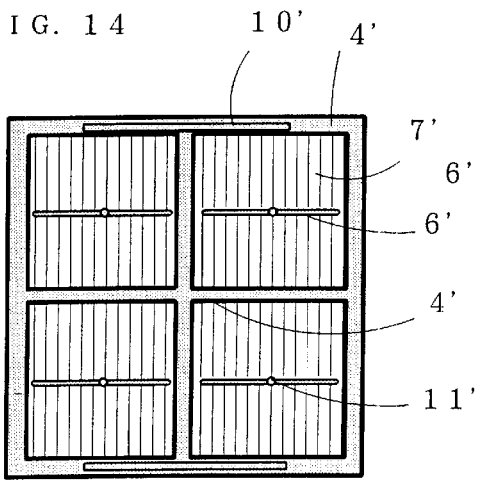

In FIG. 12, the frame 4' is divided into two pieces and two guides 6' are formed in each of two net ribs 7'. In FIG. 13, there is a cross-shaped frame 4' which is divided into rectangular four pieces. One guide 6' is formed on each of four net ribs 7', respectively. FIG. 14 shows the case of FIG. 13, excepting the bypass wall 10 formed to be opposed to a passage 3'. FIG. 15 shows the case of FIG. 12, excepting piano wire ribs 15' for reinforcement, which is added in order to prevent warpage of the net ribs 7'. By molding an article having piano wire grooves finer than the fine grooves and extending to a direction intersecting the fine grooves, the linearity of the net ribs 7' can be maintained and the net can be strengthened. Accordingly, a molded net article having high degree of strength can be obtained. FIG. 16 shows an example in which piano wire ribs 15' are utilized as various patterns or indications.

Figure 17:
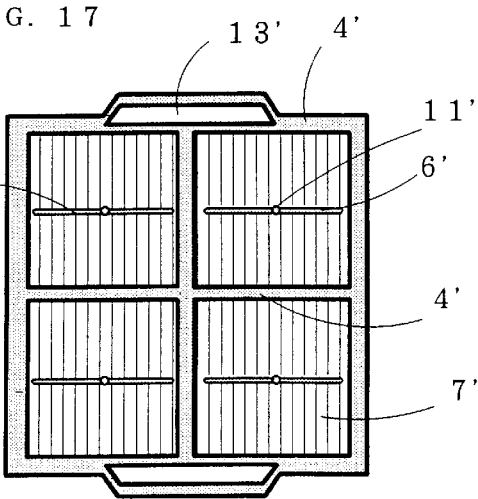
Figure 24:
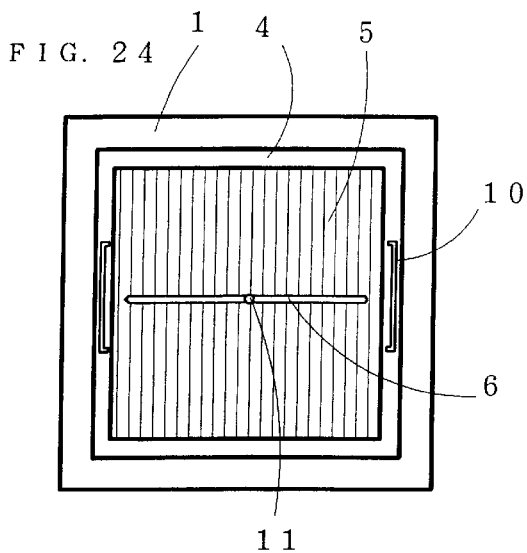
Figure 27:
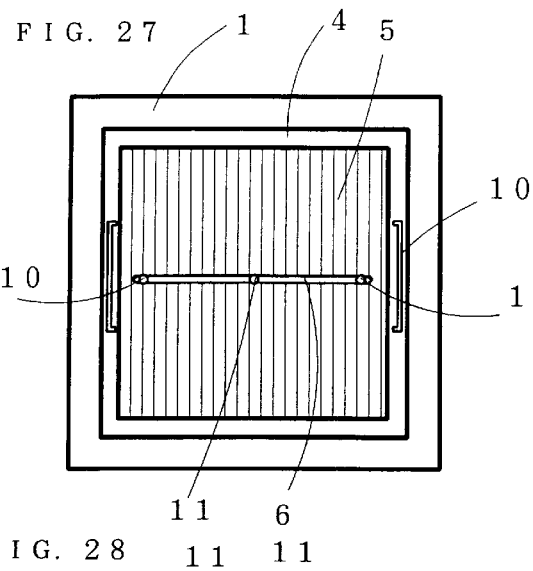

FIG. 17 shows an example in which mold fitting walls 13' are formed at each position in which the passage 3 is faced. A space is formed at each of the mold fitting walls 13' after molding since the molten resin does not flow to the mold fitting walls. In this embodiment, the space at the mold fitting walls 13' can be used as a handle.

And, a frame 4' having a traversed portion dividing the frame 7' into two parts can be formed. The traversed portion has a thinner shape than the outer frame groove 4 in order to increase the aperture rate when the article is used as a filter.

FIG. 18 shows a mold structure for preventing the molten resin from entering through the passage groove into the frame groove without any obstacle. Constricted portions 16 are formed at both ends of the passage groove communicating with the frame groove 4 and the passage groove 3 are connected to the frame groove 4 through the ends having enlarged diameter or enlarged width. Since the frame groove 4 and the passage groove 3 are perfectly connected with each other, the frame and the net rib are securely formed.

FIG. 19 shows another mold structure for preventing the molten-resin from entering through the passage groove into the frame groove without any obstacle. The ends of the passage groove communicating with the frame groove are sharp-pointed for connection. Since the ends of the passage groove connected to the frame groove are sharp-pointed, the molten resin injected through the gate formed on the passage groove can not flow directly to the frame groove through which fluids can essentially flow with good flowability by an enlarged width, but flows to the fine grooves firstly. This is an example of the case in which the formation of the net rib takes precedence. In this case, missing of the rib at the net portion can be prevented.

FIG. 20 shows still another example in which a guide groove 6 has T-shaped ends at which higher degree of pressure can be stored. The molten resin is pressed into the fine grooves 5 after a predetermined amount of the pressure is stored at the T-shaped ends. Thus, the molten resin reliably flows to the ends of the fine grooves, and a molded article which requires fine net can be obtained by the low-pressure molding method.

FIG. 21 shows an example in which the guide groove 6 having the T-shaped end has a shortened length. The length of the passage groove is variable according to the desired aperture rate or desired shape of the net of the article to be molded.

FIG. 22 shows an example in which the guide groove 6 has a S-shape. The molten resin is injected through the fine grooves 5 in zigzags. Thus, the molten resin can uniformly progress within the fine grooves 5 consisting the net no matter how large an article to be molded may be. In this case, the passage groove 6 has some parts close to the frame groove and another parts remote from the frame groove since the passage groove has a S-shaped form. Thus, band-shaped grooves 12 having a large diameter may be extended directly from the frame groove 4.

FIG. 23 shows an example in which a band-shaped grooves 12 are formed in a direction intersecting the groove 6. The band-shaped grooves 12 have a S-shaped configuration, respectively. The molten resin injected through the gate formed on the passage groove is massive, whereby effecting rapid molding of the net and the entrance of the molten resin in zigzags with respect to the fine grooves. Thus, the molten resin can uniformly progress within the fine grooves consisting the net no matter how large an article to be molded may be.

The band-shaped grooves 12 according to the present invention are classified into two classes. One is a band-shaped groove intersecting the passage groove and the other is a band-shaped groove directly extending from the frame groove.

The utility of the band-shaped groove is described in Japanese Patent Application No. Pei 8(1996)-303430 filed by the applicant of the present invention. Followings are the simplified description of the principle of the above disclosure.

Figure 67:
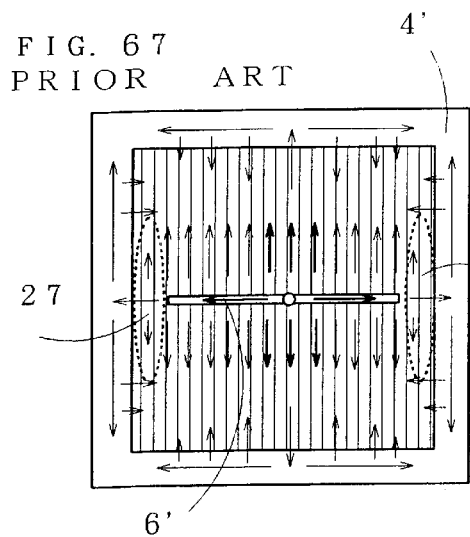
FIG. 67 is a view illustrating the flow behavior of the molten resin in the injection mold according to the prior art.
Figure 66:
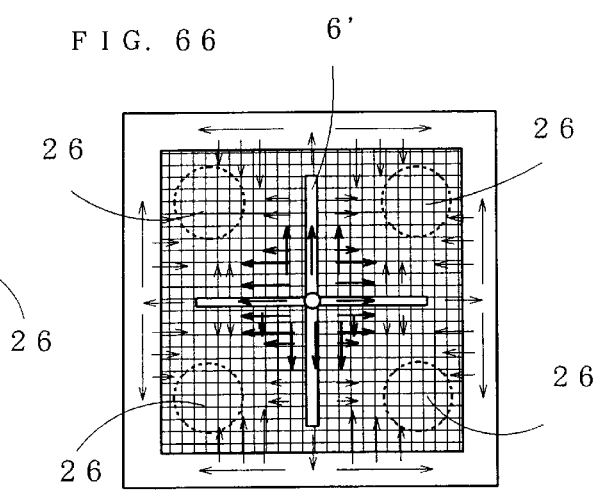
FIG. 66 is a view illustrating the flow behavior of the molten resin in the injection mold according to the present invention.
Figure 68:
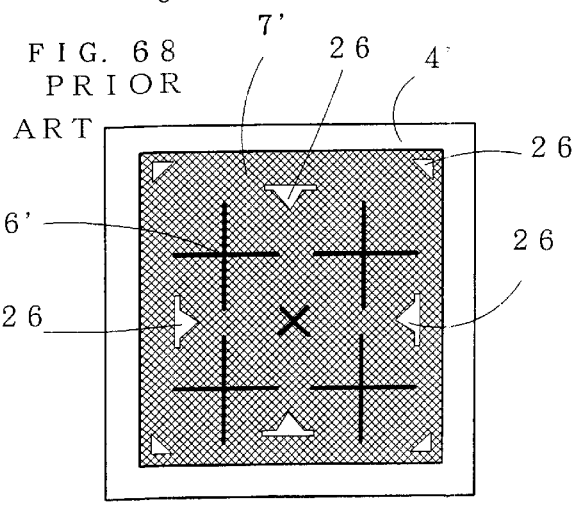
FIG. 68 is a top view of the article molded by the injection mold according to the prior art.
Figure 69:
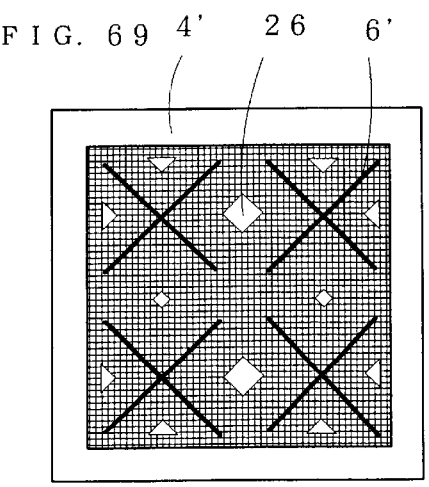
FIG. 69 is a top view of the article molded by the injection mold according to the present invention.

The band-shaped groove 12 of the frame groove 4 is for facilitating the entrance of the molten resin from the frame groove 4 to the fine grooves 5. The passage groove 3 and the guide groove 6 are related to the frame groove 4 and the fine grooves 5 directly or indirectly. Thus, the molten resin is apt to flow to the frame groove 4 having a larger width at first. Accordingly, the band-shaped grooves 12 are formed in certain portions, for example in short portions 26 shown in FIGS. 67 and 68, of the fine grooves within which the molten resin can hardly flow, whereby forming perfect net. These embodiments are shown in FIGS. 11, 51, 52 and 53. Variations having various shapes such as a semi-circle as shown in FIG. 52 or a triangle as shown in FIG. 53 can be considered.

The band-shaped groove 12 is an auxiliary configuration of the groove 6 and is used for the promotion of the entrance of the molten resin from the groove 6 to the fine grooves 5. Since the massive flow of the molten resin can promote the rapid formation of the net, the molding of the net is completed before the drop of the temperature of the molten resin. In connection with the above, the molten resin can uniformly progress within the fine grooves consisting the net no matter how large an article to be molded may be.

The variations of the band-shaped grooves are shown in FIGS. 35 to 40 and 49. Various combinations of the passage groove 3, the guide groove 6, the band-shaped groove 12, the bypass groove 10, and the auxiliary passage groove 18 are possible. As another variation, FIG. 50 shows band-shaped grooves 12 having gradually elongated configurations toward outer sides, whereby effecting the sufficiently uniform delivery of the molten resin into the fine grooves 5 remote from the gate, at which the net may hardly be formed in case of the conventional technology.

Figure 30:
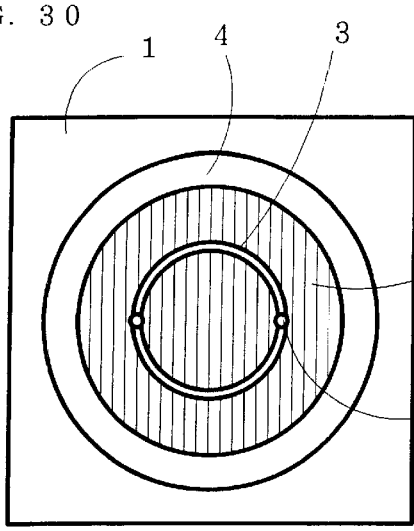
Figure 33:
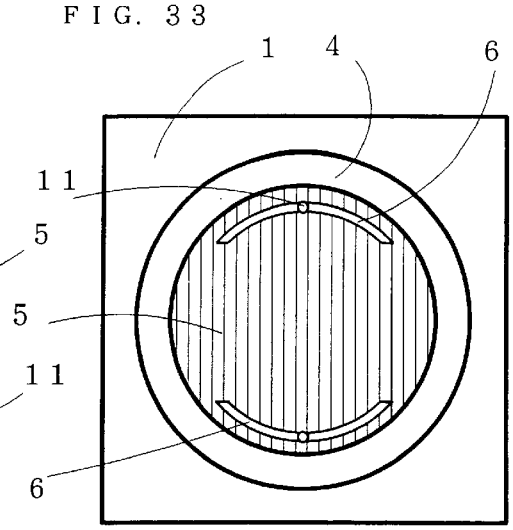
Figure 31:
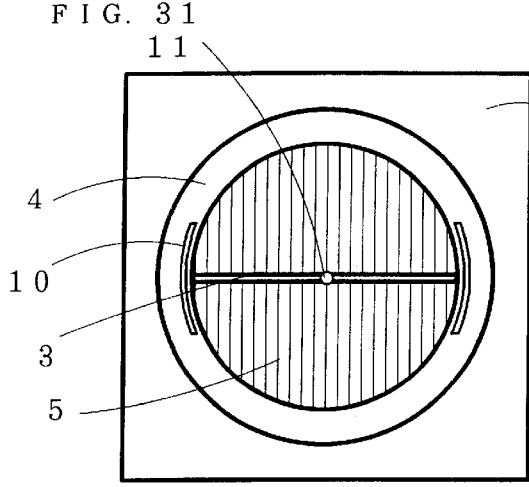
Figure 34:
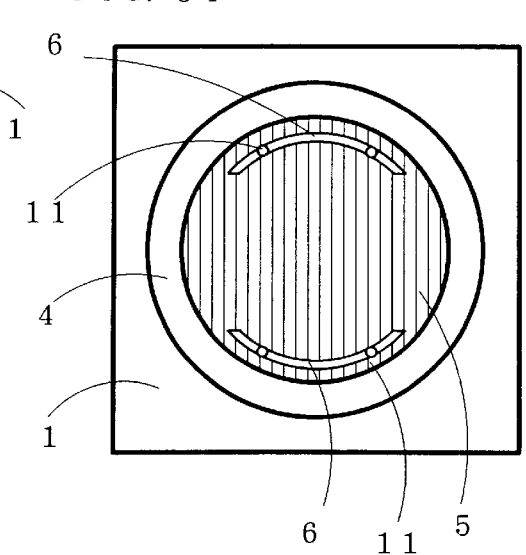
Figure 32:
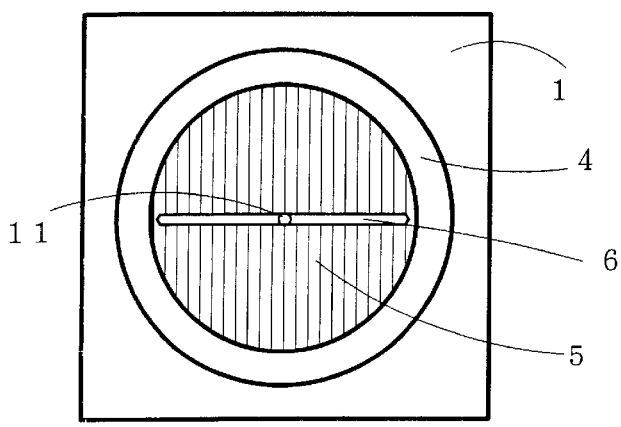
Figure 35:
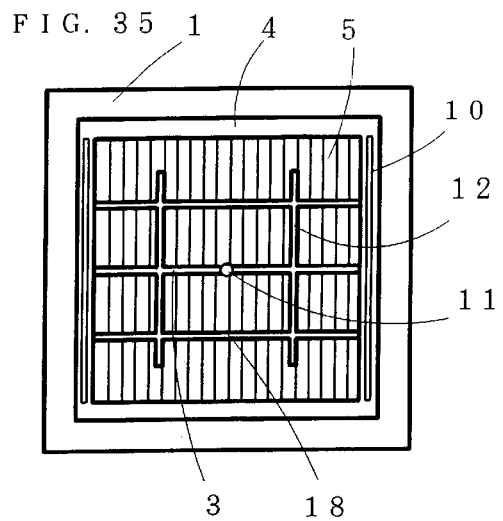
Figure 38:
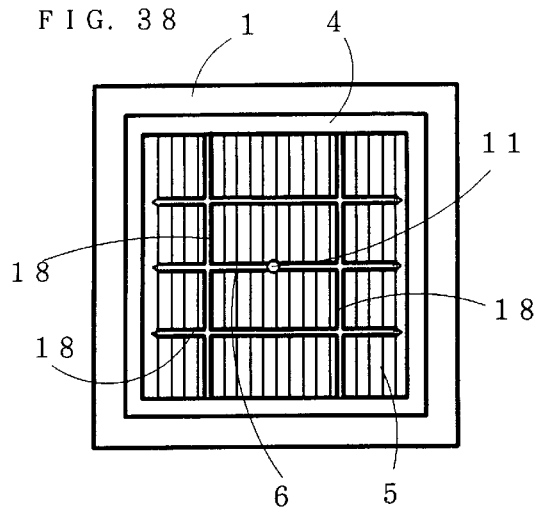
Figure 36:
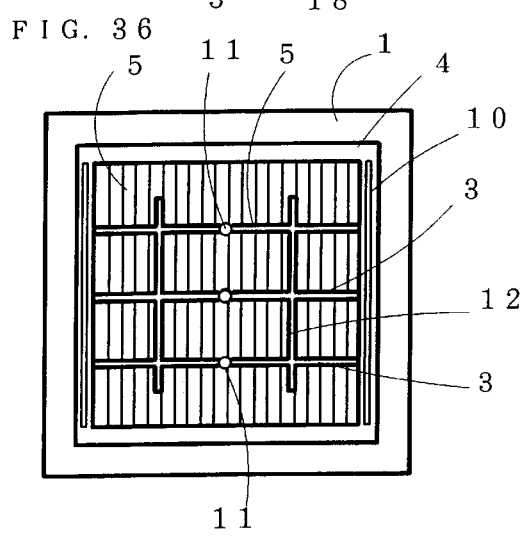
Figure 39:
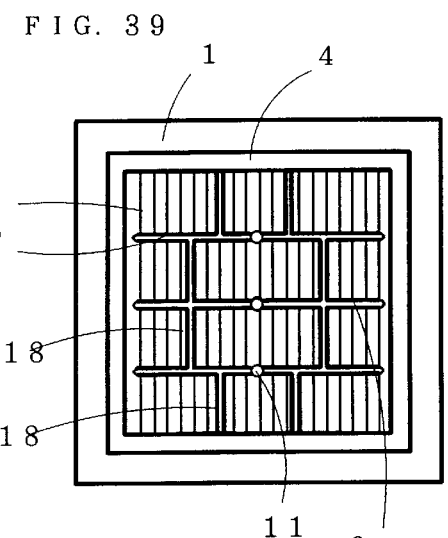
Figure 37:
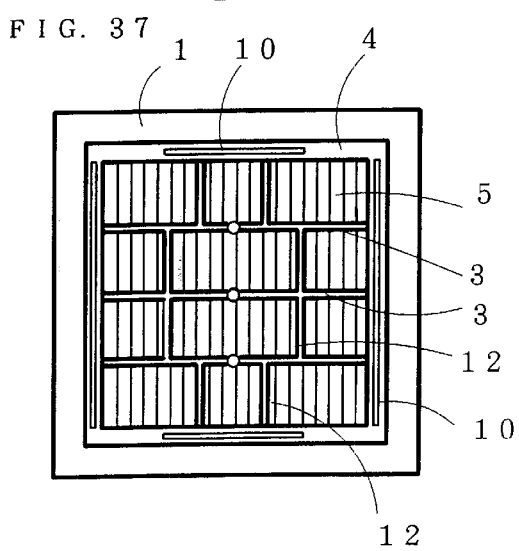
Figure 40:
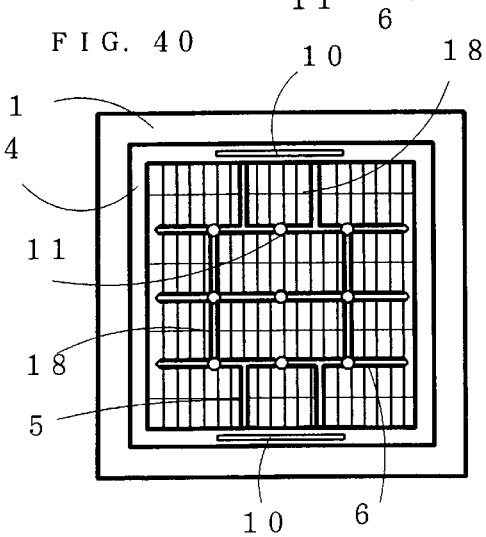
Figure 41A:
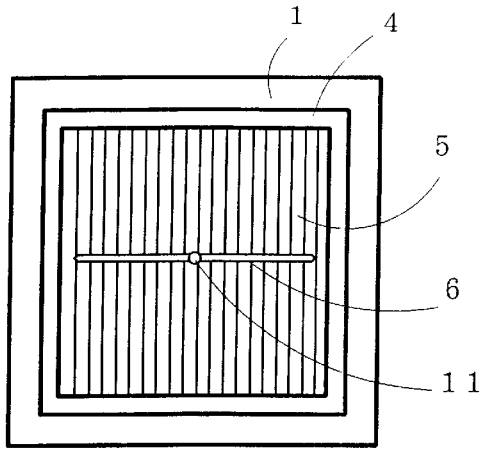
FIGS. 41a and 41b are a top view and a sectional view of the injection mold according to another embodiment of the present invention.
Figure 41B:
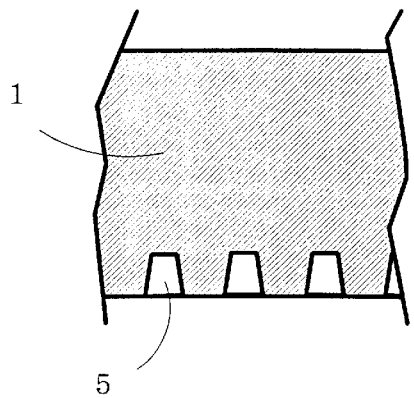
Figure 42A:
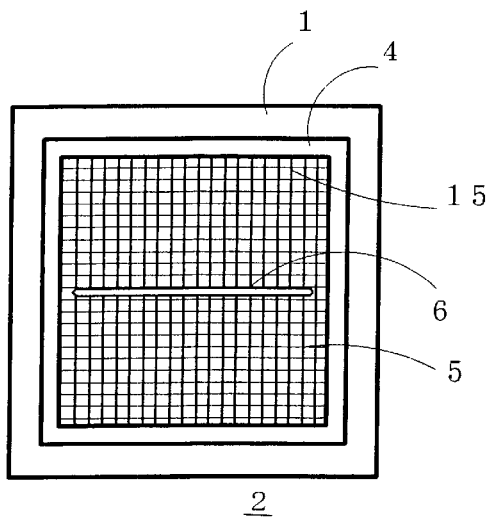
FIGS. 42a and 42b are a top view and a sectional view of the injection mold according to another embodiment of the present invention.
Figure 42B:
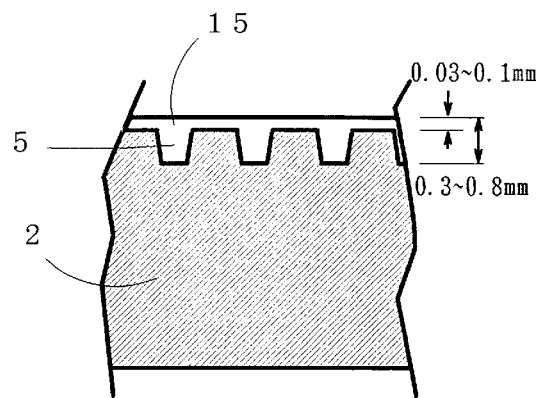

FIGS. 30 to 34 show examples in which the present invention can be applied to the circular articles to be molded. FIGS. 31 and 32 show general uses of the passage groove 3 and guide groove 6 each of which is formed in a straight line at the center of the fine grooves 5. The passage grooves 3 and guide grooves 6 may be formed in a ring-shape with two gates 11 positioned at the opposed points as shown in FIG. 30. Further, it is also possible that curved passage grooves 3 are formed at the opposed points in the vicinity of the frame groove 4 as shown in FIGS. 33 or 34. Plurality of the gates 11 may be formed on the passage groove 3. An elliptical form as shown in FIG. 61 or a triangle form as shown in FIGS. 58 to 60 is possible as variations of the present invention. In case of the triangle form, the fine grooves 5 at a base are longer than those at the other sides. Thus, the gate 11 can be formed at the vicinity of the base having longer fine grooves 5 as shown in FIG. 59, in consideration of the flow efficiency of the molten resin.

Figure 64:
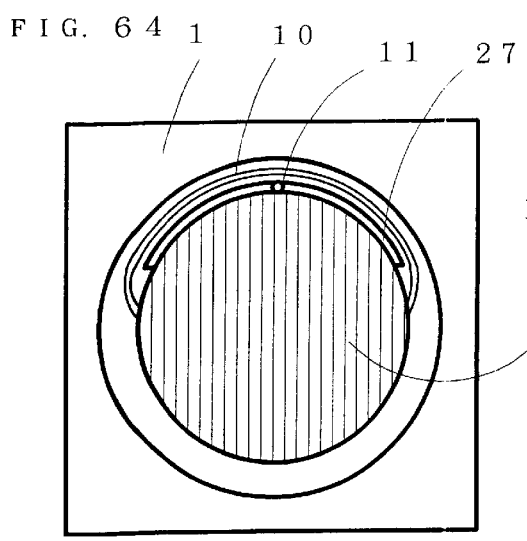
Figure 65:
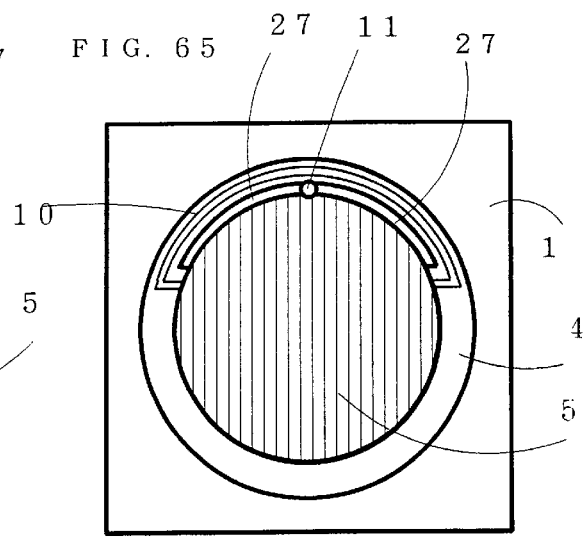

FIGS. 64 and 65 show examples in which a pressure accumulation groove 27 is formed within the frame groove 4 for acting for the passage groove or guide groove, and the gate 11 is formed on the pressure accumulation groove 27. At the same time, a bypass wall 10 or fitting wall is formed to surround the pressure accumulation groove 27.

FIG. 54 shows an example in which the groove 6 has a cross-shaped form having a large diameter or a large width. In this configuration, a great amount of the molten resin is injected through the gate 11 on the groove 6. Thus, the molding of the net can be performed rapidly and the flowing area becomes larger. Consequently, the molten resin can uniformly progress within the fine grooves consisting the net no matter how large an article to be molded may be.

Figure 43:
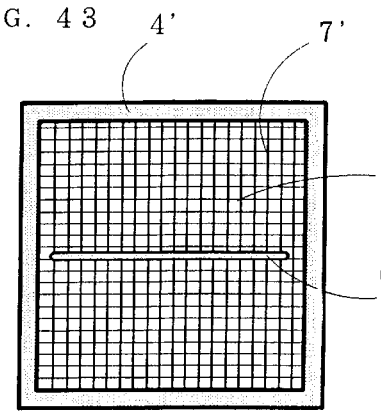
FIGS. 43 and 44 are top views of the molded articles formed by the injection molds of the present invention, respectively.
Figure 44:
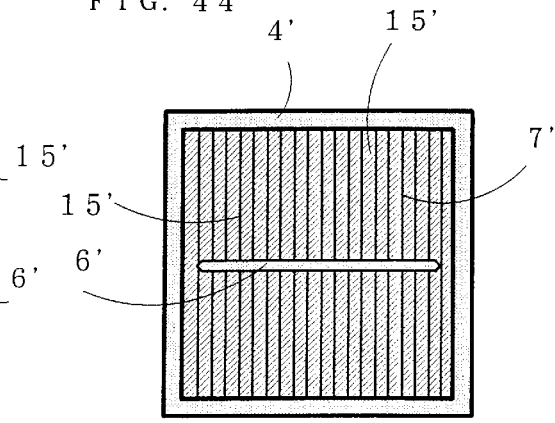

FIGS. 41 to 44 show examples in which piano wire grooves 15 having a thinner width and a smaller depth are combined in order to reinforce the fine grooves 5 and prevent the fine grooves 5 from deforming. FIG. 41a shows an upper mold 1 having the fine grooves 5, the frame groove 4 and the guide groove 6, and FIG. 41b shows a partially sectional view of FIG. 41a. FIG. 42a shows a lower mold 2 having the fine grooves 5, the frame groove 4, the guide groove 6 and the piano wire grooves 15, and FIG. 42b shows a partially sectional view of FIG. 42a. The main purpose of the formation of the piano wire grooves 15 is to prevent the fine grooves 5 from deforming. Thus, about 0.03 to 0.1 mm depth of the piano wire grooves 15 can be used without any practical inconvenience. The molded article fitted by press is shown in FIG. 43. Each of the piano wire grooves 15' essentially has a very small width or depth, so that there is no bad influence on the flow of the molten resin differently from the conventional latticed net and it is possible to prevent the net rib 7' from being deformed. FIG. 44 shows another variation of the present invention, in which piano wire ribs 15' are tilted.

Figure 45:
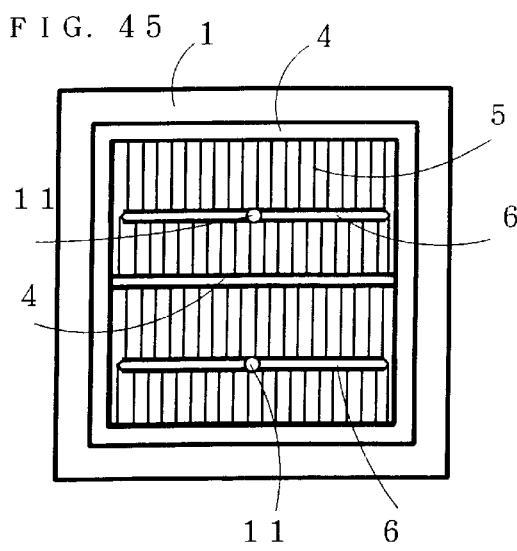
FIGS. 45 to 47 are top views of the injection molds according to other embodiments of the present invention, respectively.

FIG. 45 shows an example in which the fine grooves 5 are divided into plural blocks in the frame groove 4, and the pitch of each fine groove 5 at a block of the plural blocks is shifted to the side by a half of the pitch with respect to that of another block at the portion in which the guide grooves 6 are formed. According to the above configuration, a filter having the same functions as the honey-comb filter can be realized by a simple mold structure.

Figure 46:
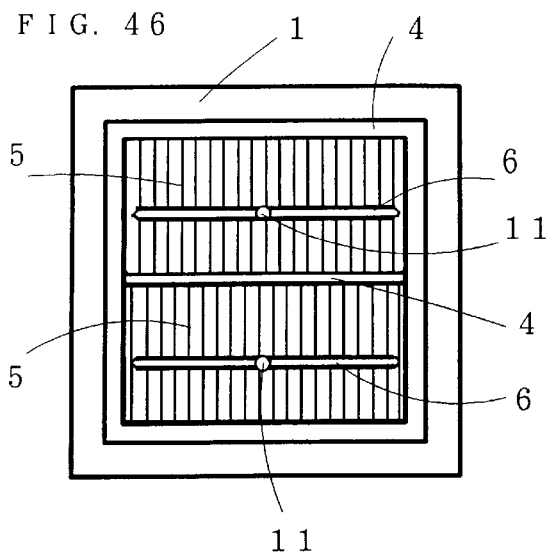

FIG. 46 shows another example in which the fine grooves 5 are divided into plural blocks in the frame groove 4, and the pitch of each fine groove 5 at a block of the plural blocks is shifted to the side by a half of the pitch with respect to that of another block at the portion in which the frame groove 4 is formed According to the above configuration, a filter having the same functions as the honey-comb filter can be realized by a simple mold structure.

Figure 47:
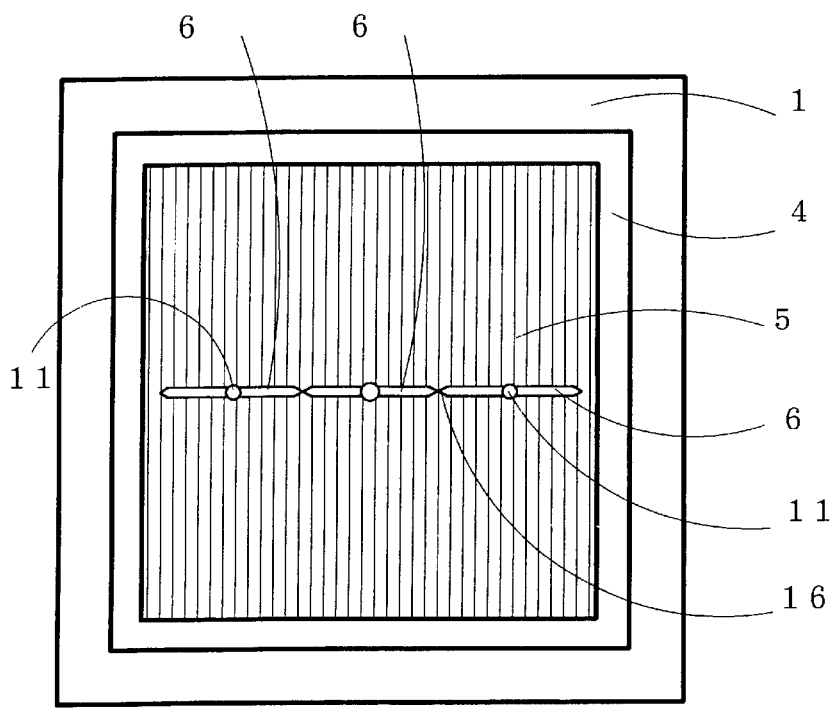
Figure 48:
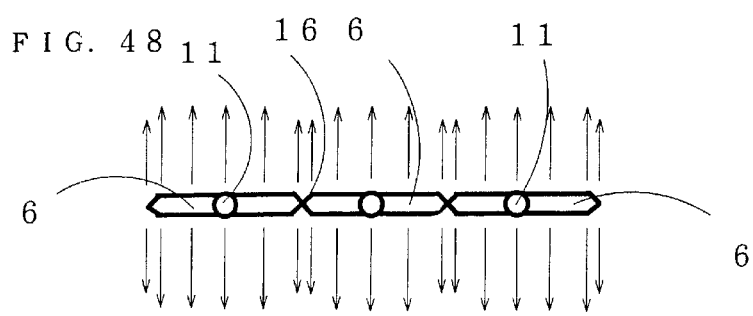
FIG. 48 is a view illustrating the flow behavior of the molten resin.

FIG. 47 shows a configuration for increasing the accumulation of the pressure of the molten resin, in which the guide groove 6 has constriction portions 16 so that the guide groove 6 is divided into three portions. Generally, the flowability of the molten resin injected through the gates 11 is decreased according as the distance from the center of the gate 11 is increased, as shown by arrows representing power of discharge of the molten resin. To prevent the above problem, a plurality of short guide grooves 6 is formed equivalently and the gates 11 are formed thereon, whereby preventing the flowability of the molten resin from being decreased.

FIGS. 49 to 53 show examples in which relatively thick piano wire grooves 15 or relatively thin frame groove 4 are formed in a direction intersecting the fine grooves 5 in order to strengthen the net and improve the flowability of the molten resin.

Figure 55:
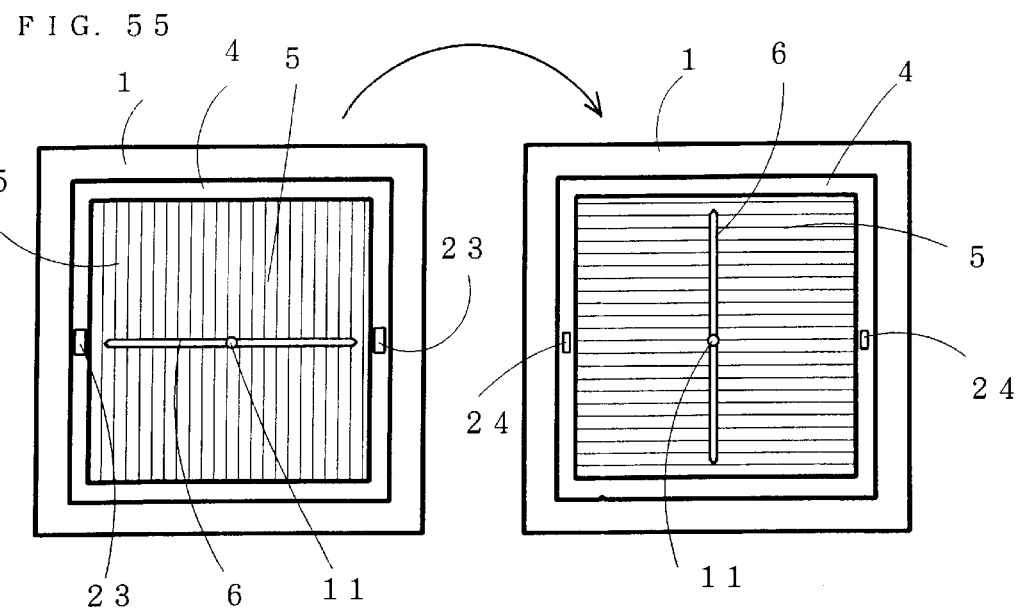
FIG. 55 is a top view of the upper mold and the lower mold of the injection mold according to another embodiment of the present invention.

FIG. 55 shows an example in which engaging parts are formed within the frame groove or on the outer periphery of the frame groove so that a plurality of separate filters are freely assembled to make possible to apply the assembly to various applications.

Each of the upper molds 1 comprises fine grooves 5 having a direction intersecting those of the other upper molds 1, the guide groove 6, and the frame groove 4. Engaging grooves 23 are formed in both sides of one upper mold 1 and engaging protrusions 24 are formed on both sides of the other upper mold 1 so as to be engaged into the engaging grooves 23.

In case of a fine net filter of 60 to 100 mesh, the assembly of the striped molded articles according to the present invention is particularly effective, because the net ribs are formed in only one direction, whereby doubling the aperture rate of the net ribs in comparison with the case of the latticed net ribs. Since the above structure is tilted by an angle of 90° and a space of about 1 mm is formed between the molded articles, it can be considered that the aperture rate of the above structure is about 1.5 times as high as the conventional latticed net ribs. In other words, it is more advantageous to impart double aperture rate by assembling two molded articles rather than make 100 mesh by using only one molded article.

Figure 56:
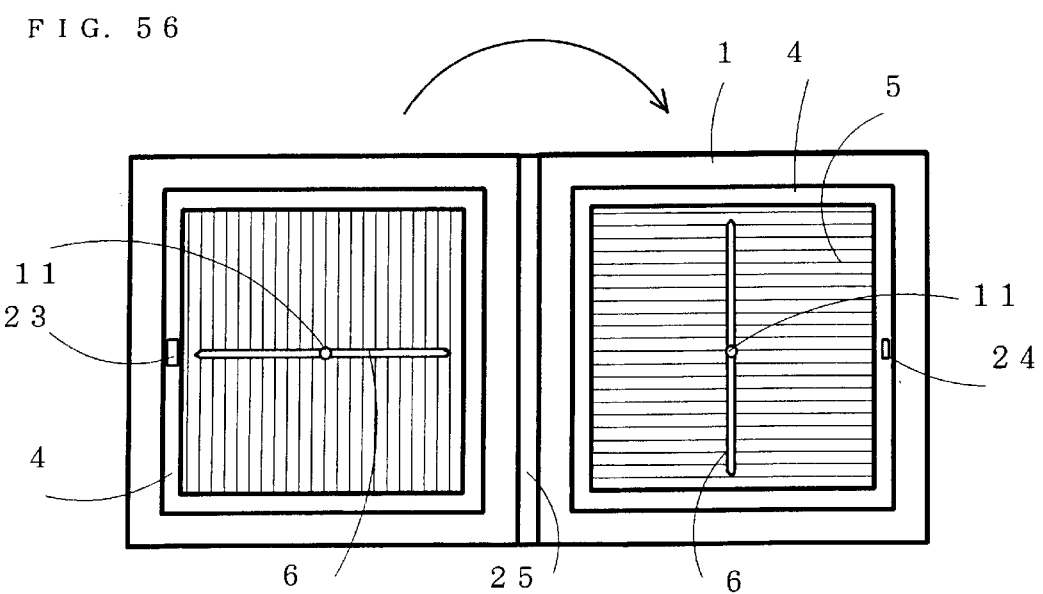
FIG. 56 is a top view of the upper mold of the injection mold according to another embodiment of the present invention.
Figure 57:
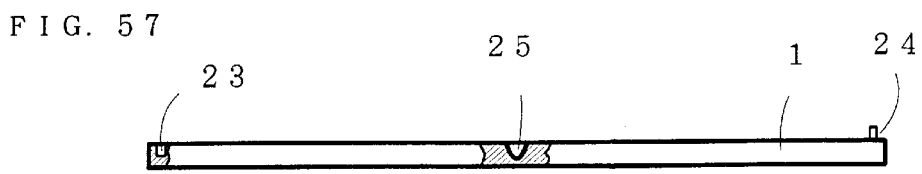
FIG. 57 is a sectional view of FIG. 56.

FIGS. 56 and 57 show a molded structure for uniting separate molded articles instead of the assembly of the separate molded articles. Two pieces of mold is provided parallel with each other on the same plane. A hinge groove 25 are formed between the two molds and the engaging groove 23 and the engaging protrusion 24 are provided so that a folding filter can be realized by a very simple mold structure.

According to the present invention, the fine grooves are symmetrically formed in each of the upper mold and lower mold in one direction, respectively. Thus, the molten resin can smoothly flow within the mold in comparison with the case of the latticed fine grooves formed of the conventional horizontal grooves and vertical grooves.

Followings are the effects of the present invention corresponding to the claims.

Fine grooves are formed in the upper mold and the lower mold only in one direction symmetrically and fitted with each other. Thus, it is impossible for the molten resin streams flowing within the mold to collide with each other between the fine grooves and the flow of the molten resin is particularly smooth. As a result, it is possible to form a molded article having a large area or a molded article having minute net structure in large quantities with a good yield by the low-injection pressure and a small power for fitting molds in a short time.

In addition to the above effect, the passage groove has a sharp-pointed end. Thus, the molten resin injected through the gate on the passage groove can not be directly entered into the frame groove having a large width, but preferentially flows toward the fine grooves, whereby preventing missing of net ribs.

In addition, the guide groove having a large diameter or a large width is not directly connected to the frame groove, and closed at the end. Thus, the molten plastic material is pressed into the fine grooves to flow up to the end of the fine groove after the pressure of the molten material is stored at the closed end, whereby effecting the molding of the articles in which fine nets should be formed by the low-pressure molding.

In addition, ends of the guide groove has a T-shaped form. Thus, more powerful pressure can be stored before the molten plastic material pressed into the fine grooves communicating with the guide groove, and the molten plastic material is reliably entered up to the end of the fine grooves. Accordingly, it is possible to mold the articles in which fine nets should be formed by the low-pressure molding.

Further, a band-shaped groove having a large diameter or a large width is formed in a direction intersecting the passage groove. Thus, a large quantity of the molten resin can be injected through the gate on the passage groove, and the net can be rapidly molded. And, large molded articles can be easily formed.

Also, a band-shaped groove is formed in a S-shaped configuration in a direction intersecting the passage groove. Thus, a large quantity of the molten resin can be injected through the gate on the passage groove, and the net can be rapidly molded. At the same time, the molten resin is entered in zigzags with respect to the fine grooves. Thus, the molten resin can be uniformly entered into the fine grooves consisting the net no matter how large an article to be molded may be.

Still further, there is provided a plurality of band-shaped groove intersecting the passage groove. Thus, a large quantity of the molten resin can be injected through the gate on the passage groove, and the net can be rapidly molded. At the same time the area through which the molten resin can flow becomes larger. Thus, the molten resin can be uniformly entered into the fine grooves consisting the net no matter how large an article to be molded may be.

In addition, a plurality of band-shaped groove is formed to have a gradually elongated configuration. Thus, it is possible to form the net in a remote area from the gate, which may hardly be formed in case of the conventional case.

Also, a cross-shaped passage groove having a large diameter or a large width is provided. Thus, a large quantity of the molten resin can be injected through the gate on the passage groove, and the net can be rapidly molded. At the same time, the area through which the molten resin can flow becomes larger. Thus, the molten resin can be uniformly entered into the fine grooves consisting the net no matter how large an article to be molded may be.

Further, there is provided a passage groove curved to have a similar form to the circular frame groove. Thus, a circular net article can be easily formed by using a simple mold structure. At the same time, the aperture ratio at the center of a filter can be increased because there is no passage groove having a large diameter or a large width at the center of the filter.

Engaging grooves are formed within the frame groove or outer periphery of the frame groove. Thus, a plurality of separate filters are freely assembled to make possible to apply the assembled filters to various applications.

Two mold pieces are provided on the same plane and a hinge groove is formed therebetween. Thus, a folding filter can be realized by a very simple mold structure.

In addition, a wall is formed for momently halting the entrance of the molten resin into the frame groove. Thus, the molten resin can be preferentially entered into the fine grooves and missing of the net can be prevented.

In addition, a band-shaped groove is communicated with the frame groove. Thus, the passage groove or the guide groove has a role for preventing missing of the net and the molten resin can be uniformly entered into the fine grooves consisting the net.

Further in addition, piano wire grooves thinner than the fine grooves are formed in a direction intersecting the fine grooves. Thus, the linearity of the fine grooves can be maintained, and at the same time, the nets are strengthened. Accordingly, a molded article having a high strength can be obtained.

Also in addition, the fine grooves of the upper mold have the same width and the same depth as the fine grooves of the lower mold. Thus, a double-sided filter can be obtained by using a simple mold structure.

In addition the fine grooves of the upper mold have a larger or smaller depth and a larger or smaller width than the fine grooves of the lower mold. Thus, it is possible to realize a one-sided filter which has one side through which fluids such as air can be easily entered and the other side through which fluids such as air can be hardly entered.

Still further in addition, the fine grooves are divided into plural blocks in the frame groove, and the pitch of the fine grooves at a block is shifted to the side with respect to that of another block. Thus, a filter having the same functions as the honey-comb filter can be realized by a simple mold structure.

While the invention has been described in its preferred embodiments, it is to be understood that many variations of such embodiments exist. Such variations are intended to be within the scope of the present invention and the appended claims.

What is claimed is:

1. An injection molding apparatus for molding a plastic article having a frame by fitting an upper mold and a lower mold by pressing, and injecting molten resin through a gate, wherein the improvement comprises:

(a) a net groove formed in stripes by a plurality of first grooves extended only in one direction in the upper mold, and a plurality of second grooves extended only in the said one direction in the lower mold, ones of the first grooves in the upper mold and the second grooves in the lower mold being faced with each other and extending in substantially the same direction relative to one another, ones of said first and second grooves having first and second respective ends;

(b) at least one passage groove having a larger diameter width relative to the first grooves and the second grooves for facilitating the fluidity of the molten resin, one or more of the passage grooves intersecting the first grooves and the second grooves being formed on the first grooves of the upper mold and/or the second grooves of the lower mold;

(c) at least one gate formed on the passage groove for injecting the molten resin into the mold; and (d) a frame groove formed to surround the first and second ends of the first grooves in the upper mold and/or the first and second ends of second grooves in the lower mold.

2. An injection molding apparatus as claimed in claim 1, wherein the passage groove is in communication with the frame groove through a narrowed end of the passage groove, in order to inhibit the molten resin from entering into the frame groove from the passage groove without any obstacle.

3. An injection molding apparatus as claimed in claim 1, wherein the first grooves of the upper mold have the same width and the same depth as the second grooves of the lower mold.

4. An injection molding apparatus as claimed in claim 1, wherein the first grooves of the upper mold have a larger or smaller depth than the second grooves of the lower mold.

5. An injection molding apparatus as claimed in claim 1, wherein the first grooves of the upper mold have a larger or smaller width than the second grooves of the lower mold.

6. An injection molding apparatus for molding a plastic article according to claim 1, wherein said frame groove further surrounds said first grooves in said one direction in which said first grooves extend.

7. An injection molding apparatus for molding a plastic article according to claim 1, wherein said frame groove further surrounds said second grooves in said one direction in which said second grooves extend.

8. An injection molding apparatus for molding a plastic article according to claim 1, wherein said frame groove further surrounds said first and second grooves in said one direction in which said first and second grooves extend.

* * * * *